(12) United States Patent
Kawai et al.

(10) Patent No.: US 12,075,161 B2
(45) Date of Patent: Aug. 27, 2024

(54) IMAGING APPARATUS, DRIVING METHOD, AND IMAGING PROGRAM

(71) Applicant: FUJIFILM Corporation, Tokyo (JP)

(72) Inventors: Tomoyuki Kawai, Saitama (JP); Koichi Tanaka, Saitama (JP); Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

(21) Appl. No.: 18/171,382

(22) Filed: Feb. 20, 2023

(65) Prior Publication Data

US 2023/0209194 A1 Jun. 29, 2023

Related U.S. Application Data

(63) Continuation of application No. PCT/JP2021/025380, filed on Jul. 6, 2021.

(30) Foreign Application Priority Data

Aug. 28, 2020 (JP) ................................. 2020-144966

(51) Int. Cl.
*H04N 23/68* (2023.01)
*H04N 23/667* (2023.01)
(Continued)

(52) U.S. Cl.
CPC ......... *H04N 23/683* (2023.01); *H04N 23/667* (2023.01); *H04N 23/672* (2023.01); *H04N 23/6812* (2023.01); *H04N 23/73* (2023.01)

(58) Field of Classification Search
None
See application file for complete search history.

(56) References Cited

U.S. PATENT DOCUMENTS

2005/0219642 A1* 10/2005 Yachida ............... H04N 23/667
 358/448
2007/0077055 A1 4/2007 Tominaga et al.
(Continued)

FOREIGN PATENT DOCUMENTS

JP 2006033123 2/2006
JP 2006319784 11/2006
(Continued)

OTHER PUBLICATIONS

"International Search Report (Form PCT/ISA/210) of PCT/JP2021/025380", mailed on Oct. 12, 2021, with English translation thereof, pp. 1-5.
(Continued)

*Primary Examiner* — Cynthia Segura
(74) *Attorney, Agent, or Firm* — JCIPRNET

(57) ABSTRACT

An imaging apparatus includes: an imaging sensor; and at least one processor. The processor is configured to execute: imaging processing of acquiring a plurality of first frames, which are imaged at a first frame rate in a first exposure mode, through the imaging sensor; correction processing of performing electronic shake correction on the plurality of first frames on the basis of an amount of shake delivered to the imaging apparatus; and generation processing of generating motion picture data, which has a second frame having a second frame rate lower than the first frame rate, by synthesizing the plurality of first frames. In the first exposure mode, the processor sets m as a positive integer, and makes an exposure time for an mth first frame constituting the second frame shorter than an exposure time for an (m+1)th first frame.

17 Claims, 20 Drawing Sheets

(51) Int. Cl.
    *H04N 23/67*     (2023.01)
    *H04N 23/73*     (2023.01)

(56)           References Cited

U.S. PATENT DOCUMENTS

| | | | |
|---|---|---|---|
| 2010/0277613 A1* | 11/2010 | Seki | G11B 20/1262 |
| | | | 348/231.2 |
| 2017/0353665 A1 | 12/2017 | Sato et al. | |
| 2020/0260008 A1* | 8/2020 | Kim | H04N 23/683 |
| 2021/0256670 A1* | 8/2021 | Woodall | G06T 5/20 |
| 2021/0258510 A1* | 8/2021 | Woodall | H04N 23/6845 |

FOREIGN PATENT DOCUMENTS

| | | |
|---|---|---|
| JP | 2007104029 | 4/2007 |
| JP | 2011205719 | 10/2011 |
| JP | 2017220745 | 12/2017 |
| JP | 2020096212 | 6/2020 |

OTHER PUBLICATIONS

"Written Opinion of the International Searching Authourity (Form PCT/ISA/237) of PCT/JP2021/025380", mailed on Oct. 12, 2021, with English translation thereof, pp. 1-6.

\* cited by examiner

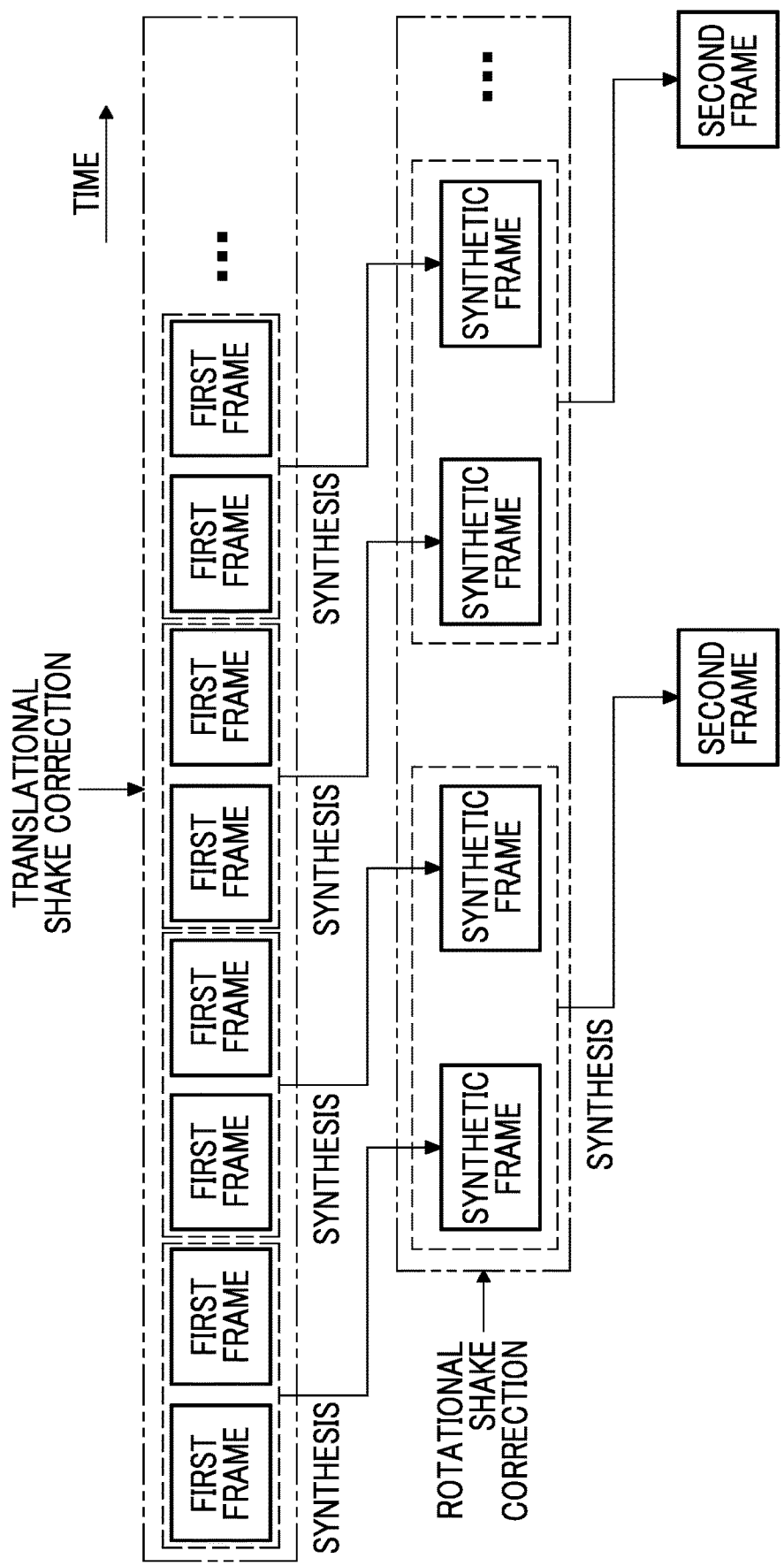

IMAGING APPARATUS, DRIVING METHOD, AND IMAGING PROGRAM

CROSS-REFERENCE TO RELATED APPLICATIONS

This application is a continuation of International Application No. PCT/JP2021/025380, filed on Jul. 6, 2021, which claims priority from Japanese Application No. 2020-144966, filed on Aug. 28, 2020. The entire disclosure of each of the above application is incorporated herein by reference.

BACKGROUND

Technical Field

The technique of the present disclosure relates to an imaging apparatus, a driving method, and an imaging program.

Related Art

In an imaging apparatus described in JP 2006-33123 A, an imaging element is configured to be capable of changing a frame rate at the time of image acquisition, and a camera shake sensor is configured to detect an amount of shake by detecting physical vibration. In a case where the amount of shake obtained from the camera shake sensor is greater than a predetermined value, the imaging apparatus sets a frame rate at the time of performing image acquisition in the imaging element to a value higher than a normal frame rate, and performs control such that the image acquisition is performed at a high-speed frame rate. Then, the imaging apparatus synthesizes images of the plurality of frames obtained in such a manner.

In an image processing apparatus described in JP 2006-319784 A, a motion vector calculation unit calculates a motion vector by which image blocks, each of which is a partial region of an image frame constituting an image signal having a first frame rate, are associated between a plurality of image frames on the basis of motion in the image. The synthesis unit synthesizes a plurality of image frames to generate one image frame by adding image blocks associated with each other by motion vectors between the plurality of image frames, and outputs the image frame as an image signal at a second frame rate lower than the first frame rate.

The image acquisition device described in JP 2007-104029 A is characterized to include: an exposure time calculation unit that calculates an exposure time of an imaging unit on the basis of an F number corresponding to a stop and a luminance of a subject; a predetermined time calculation unit that calculates a predetermined time on the basis of a focal length of a lens and a predetermined coefficient; an imaging method determination unit that acquires a plurality of subject images in a case where the exposure time is equal to or greater than a predetermined time and determines to perform the multiple-exposure imaging for acquiring a synthetic image of a subject by synthesizing the plurality of subject images; a motion detection unit that detects motion between the plurality of subject images in the multiple-exposure imaging; and a predetermined coefficient calculation unit that updates a predetermined coefficient on the basis of the detected motion amount.

SUMMARY

According to one embodiment relating to the technique of the present disclosure, there are provided an imaging apparatus, a driving method, and an imaging program capable of suppressing discontinuity of movement of a fast-moving subject while suppressing camera shake in a case where the subject is imaged.

In order to achieve the above-mentioned object, according to an aspect of the present disclosure, there is provided an imaging apparatus comprising: an imaging sensor; and at least one processor. The processor is configured to execute: imaging processing of acquiring a plurality of first frames, which are imaged at a first frame rate in a first exposure mode, through the imaging sensor; correction processing of performing electronic shake correction on the plurality of first frames on the basis of an amount of shake delivered to the imaging apparatus; and generation processing of generating motion picture data, which has a second frame having a second frame rate lower than the first frame rate, by synthesizing the plurality of first frames. In the first exposure mode, the processor sets m as a positive integer, and makes an exposure time for an mth first frame constituting the second frame shorter than an exposure time for an (m+1)th first frame.

Assuming that a unit time corresponding to a shutter speed is P, the second frame rate is V, a value obtained by dividing the first frame rate by the second frame rate is N, and n is a positive integer, and m is a maximum n satisfying $P<1/V-(n-1)/(V \times N)$, it is preferable that, in the first exposure mode, the processor generates the second frame by synthesizing mth to Nth first frames among 1st to Nth first frames, and makes the exposure time for the mth first frame shorter than the exposure time for the (m+1)th first frame.

It is preferable that a sum of respective exposure times for the mth to Nth first frames is equal to the unit time.

It is preferable that the exposure time for the mth first frame is shorter than a frame period of the first frame, and respective exposure times for (m+1)th to Nth first frames are equal to the frame period of the first frame.

It is preferable that the respective exposure times for the mth to Nth first frames are temporally continuous.

It is preferable that in a case where m≥2, the processor acquires at least one of 1st to (m−1)th first frames that are not used in generating the motion picture data.

It is preferable that the processor uses the acquired plurality of first frames in the shake correction.

It is preferable that the imaging sensor has a phase difference pixel, and the processor performs focus adjustment on the basis of a signal of the phase difference pixel included in the acquired first frame.

It is preferable that the processor makes a second exposure mode, in which exposure is performed, executable by distributing an exposure time to each of the mth to Nth first frames.

It is preferable that the processor makes the first exposure mode and the second exposure mode selectively executable.

It is preferable that the processor detects a speed of movement of a subject, selects the first exposure mode in a case where the speed of movement is equal to or greater than a constant value, and selects the second exposure mode in a case where the speed of movement is less than the constant value.

It is preferable that the processor selects the first exposure mode in a case where the amount of shake is less than a constant value, and selects the second exposure mode in a case where the amount of shake is equal to or more than the constant value.

The imaging apparatus further comprises a shake detection sensor that detects rotational shake in a roll direction and translational shake in an intersection direction intersecting a rotation axis in the roll direction. It is preferable that the processor performs translational shake correction on the plurality of first frames, and performs rotational shake correction on the second frame.

It is preferable that, in a case where M is a positive integer, N is a multiple of M, and M<N, the processor performs shake correction on the plurality of first frames on the basis of a first amount of shake in which the shake correction is completed in 1/(V×N) seconds, in the amount of shake, performs shake correction on a synthetic frame obtained by synthesizing M first frames on the basis of a second amount of shake in which the shake correction is completed in 1/(V×M) seconds, in the amount of shake, and generates the second frame by synthesizing N/M synthetic frames.

It is preferable that the processor performs shake correction of rotational shake in a roll direction on the second frame, in the amount of shake, and performs shake correction of translational shake in an intersection direction intersecting a rotation axis in the roll direction on the plurality of first frames, in the amount of shake.

According to an aspect of the present disclosure, there is provided a driving method of an imaging apparatus including an imaging sensor. The driving method comprises: an imaging step of acquiring a plurality of first frames, which are imaged at a first frame rate in a first exposure mode, through the imaging sensor; a correction step of performing electronic shake correction on the plurality of first frames on the basis of an amount of shake delivered to the imaging apparatus; and a generation step of generating motion picture data, which has a second frame having a second frame rate lower than the first frame rate, by synthesizing the plurality of first frames. In addition, it is preferable that in the first exposure mode, m is a positive integer, and an exposure time for an mth first frame constituting the second frame is made shorter than an exposure time for an (m+1)th first frame.

According to an aspect of the present disclosure, there is provided an imaging program that operates an imaging apparatus including an imaging sensor. The imaging program is configured to execute: imaging processing of acquiring a plurality of first frames, which are imaged at a first frame rate in a first exposure mode, through the imaging sensor; correction processing of performing electronic shake correction on the plurality of first frames on the basis of an amount of shake delivered to the imaging apparatus; and generation processing of generating motion picture data, which has a second frame having a second frame rate lower than the first frame rate, by synthesizing the plurality of first frames. In the first exposure mode, m is a positive integer, and an exposure time for an mth first frame constituting the second frame is made shorter than an exposure time for an (m+1)th first frame.

BRIEF DESCRIPTION OF THE DRAWINGS

FIG. 21 is a diagram showing shake correction according to a fifth embodiment.

DESCRIPTION

An example of an embodiment relating to the technique of the present disclosure will be described with reference to the accompanying drawings.

First, the wording used in the following description will be described.

In the following description, the "IC" is an abbreviation for "Integrated Circuit". The "CPU" is an abbreviation for "Central processing Unit". The "ROM" is an abbreviation for "Read Only Memory". The "RAM" is an abbreviation for "Random Access Memory". The "CMOS" is an abbreviation for "Complementary Metal Oxide Semiconductor".

The "FPGA" is an abbreviation for "Field-Programmable Gate Array". The "PLD" is an abbreviation for "Programmable Logic Device". The "ASIC" is an abbreviation for "Application Specific Integrated Circuit". The "OVF" is an abbreviation for "Optical View Finder". The "EVF" is an abbreviation for "Electronic View Finder". The "JPEG" is an abbreviation for "Joint Photographic Experts Group". The "DSP" is an abbreviation for "Digital Signal processor".

As used herein, the term "equal" includes not only being exactly equal, but also being substantially equal in the sense that it includes errors that are generally tolerated in the art of the technique of the present disclosure. Further, as used herein, the term "intersecting" includes not only intersecting at an angle of 90°, but also substantially intersecting in the sense that it includes errors that are generally tolerated in the art of the technique of the present disclosure.

First Embodiment

As a first embodiment of the imaging apparatus, the technique of the present disclosure will be described by using an interchangeable lens digital camera as an example. The technique of the present disclosure is not limited to the interchangeable lens type, and can be applied to a digital camera having a lens integrated therein.

(Configuration of Imaging Apparatus)

Figure 1:
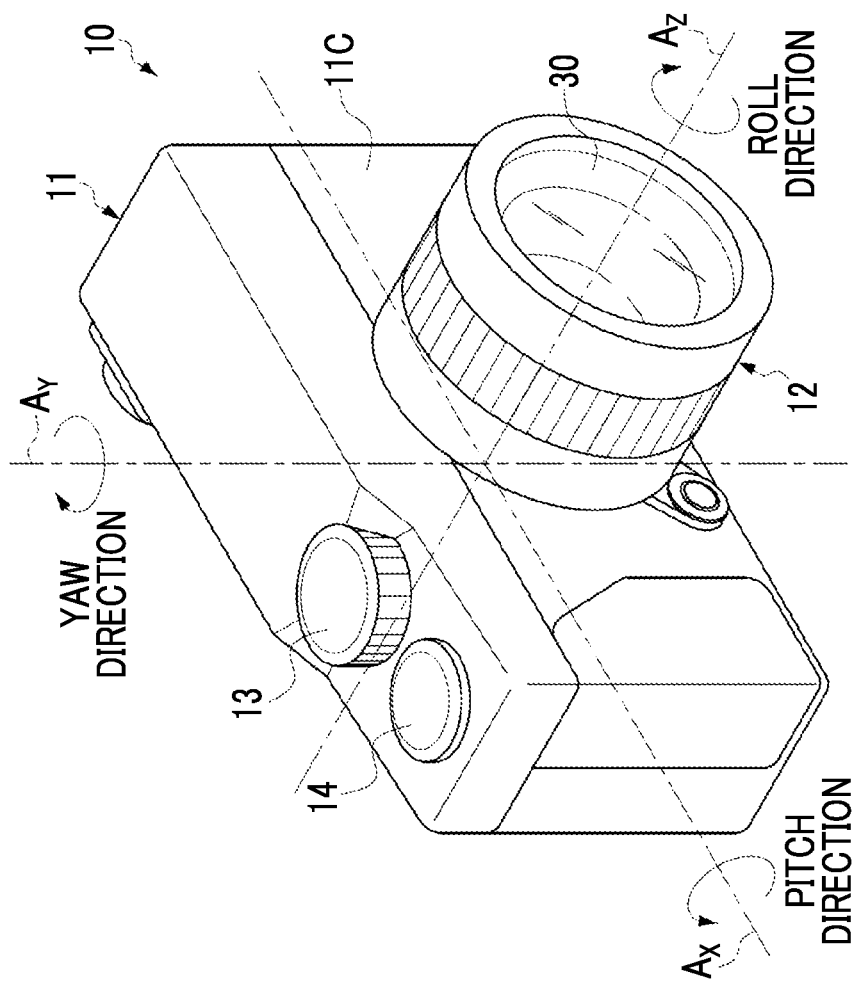
FIG. 1 is a schematic perspective view showing an example of a front side of an imaging apparatus.

FIG. 1 shows an example of a front side of the imaging apparatus 10. As shown in FIG. 1, the imaging apparatus 10 is an interchangeable lens digital camera. The imaging apparatus 10 is composed of a body 11 and an imaging lens 12 which is interchangeably mounted on the body 11. The imaging lens 12 is mounted on the front surface 11C side of the body 11 through the camera side mount 11A and the lens side mount 12A (refer to FIG. 3). The imaging lens 12 is an example of a lens according to the technique of the present disclosure.

A dial 13 and a release button 14 are provided on an upper surface of the body 11. The dial 13 is operated in a case of setting the operation mode or the like. Examples of the operation mode of the imaging apparatus 10 include a still picture imaging mode, a motion picture imaging mode, and an image display mode. The release button 14 is operated by a user at the time of starting execution of the still picture imaging or the motion picture imaging.

The Z axis $A_Z$ shown in FIG. 1 corresponds to an optical axis of the imaging lens 12. The X axis $A_X$ and the Y axis $A_Y$ are orthogonal to each other and orthogonal to the Z axis $A_Z$. The X axis $A_X$ and the Y axis $A_Y$ correspond to a pitch axis and a yaw axis according to the technique of the present disclosure. In the following description, a direction of rotation around the Z axis $A_Z$ is referred to as a roll direction. Further, a direction of rotation around the X axis $A_X$ is referred to as a pitch direction. Furthermore, a direction of rotation around the Y axis $A_Y$ is referred to as a yaw direction. Further, a direction of the X axis $A_X$ is referred to as the X direction, and a direction of the Y axis $A_Y$ is referred to as the Y direction. The Z axis $A_Z$ is an example of a "rotation axis" according to the technique of the present disclosure. It should be noted that the X direction and the Y direction are examples of the "intersection direction intersecting the rotation axis" according to the technique of the present disclosure.

Figure 2:
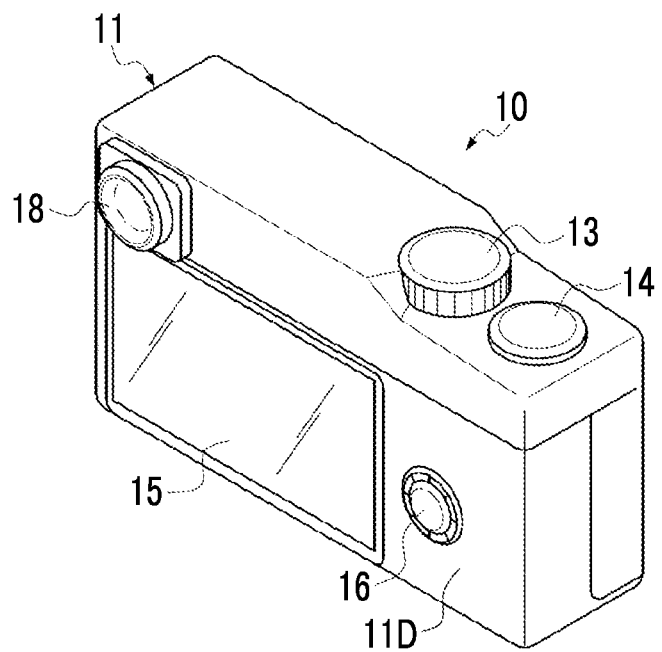
FIG. 2 is a schematic perspective view showing an example of a rear side of the imaging apparatus.

FIG. 2 shows an example of the rear side of the imaging apparatus 10. As shown in FIG. 2, a display 15, an instruction button 16, and a finder eyepiece portion 18 of a finder 17 are provided on the rear surface 11D of the body 11. As the finder, an optical view finder or an electronic view finder can be adopted. The display 15 displays an image on the basis of an image signal obtained by imaging, various menu screens, and the like. The instruction button 16 receives various instructions.

Figure 3:
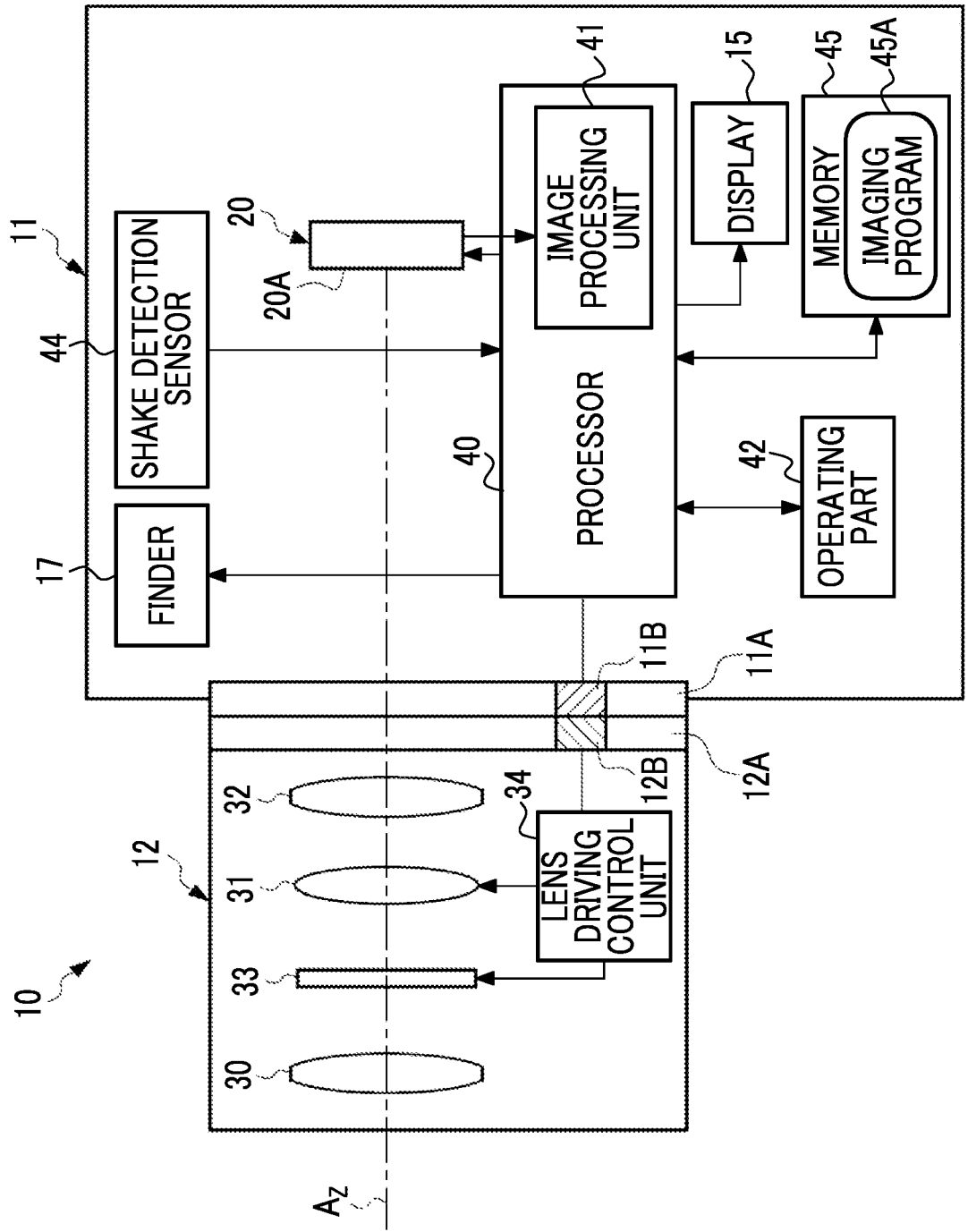
FIG. 3 is a diagram showing an example of an internal configuration of the imaging apparatus.

FIG. 3 shows an example of an internal configuration of the imaging apparatus 10. The body 11 and the imaging lens 12 are electrically connected to each other by bringing an electrical contact 11B provided on a camera side mount 11A into contact with an electrical contact 12B provided on a lens side mount 12A.

The imaging lens 12 includes an objective lens 30, a focus lens 31, a rear end lens 32, and a stop 33. Each member is disposed in an order of the objective lens 30, the stop 33, the focus lens 31, and the rear end lens 32 from the objective side along the optical axis (that is, the Z axis $A_Z$) of the imaging lens 12. The objective lens 30, the focus lens 31, and the rear end lens 32 constitute an imaging optical system. The type, number, and arrangement order of the lenses constituting the imaging optical system are not limited to the example shown in FIG. 3.

Further, the imaging lens 12 has a lens driving control unit 34. The lens driving control unit 34 is composed of, for example, a CPU, a RAM, a ROM, or the like. The lens driving control unit 34 is electrically connected to a processor 40 in the body 11 through the electrical contact 12B and the electrical contact 11B.

The lens driving control unit 34 drives the focus lens 31 and the stop 33 on the basis of a control signal which is transmitted from the processor 40. In order to adjust focus of the imaging lens 12, the lens driving control unit 34 performs driving control of the focus lens 31 on the basis of a control signal for focus adjustment transmitted from the processor 40. The processor 40 performs, for example, vertex adjustment of the phase difference method.

The body 11 is provided with an imaging sensor 20, the processor 40, an image processing unit 41, an operating part 42, a shake detection sensor 44, a memory 45, and the display 15. The processor 40 controls operations of the imaging sensor 20, the image processing unit 41 as a part of the processor 40, the operating part 42, the shake detection sensor 44, the memory 45, and the display 15. The processor 40 is composed of, for example, a CPU, a RAM, a ROM, or the like. In such a case, the processor 40 executes various kinds of processing on the basis of an imaging program 45A which is stored in the memory 45. The processor 40 may be composed of an aggregate of a plurality of IC chips. In addition, the imaging sensor 20 is, for example, a CMOS image sensor.

The shake detection sensor 44 detects an amount of shake delivered to the imaging apparatus 10. The shake detection sensor 44 is, for example, a 5-axis shake detection sensor that detects shake in each of the roll direction, the yaw direction, the pitch direction, the X direction, and the Y direction. Hereinafter, the shake in the roll direction is referred to as rotational shake. The shake in the yaw direction and the pitch direction is referred to as angular shake. The shake in the X and Y directions is referred to as translational shake.

Figure 4:
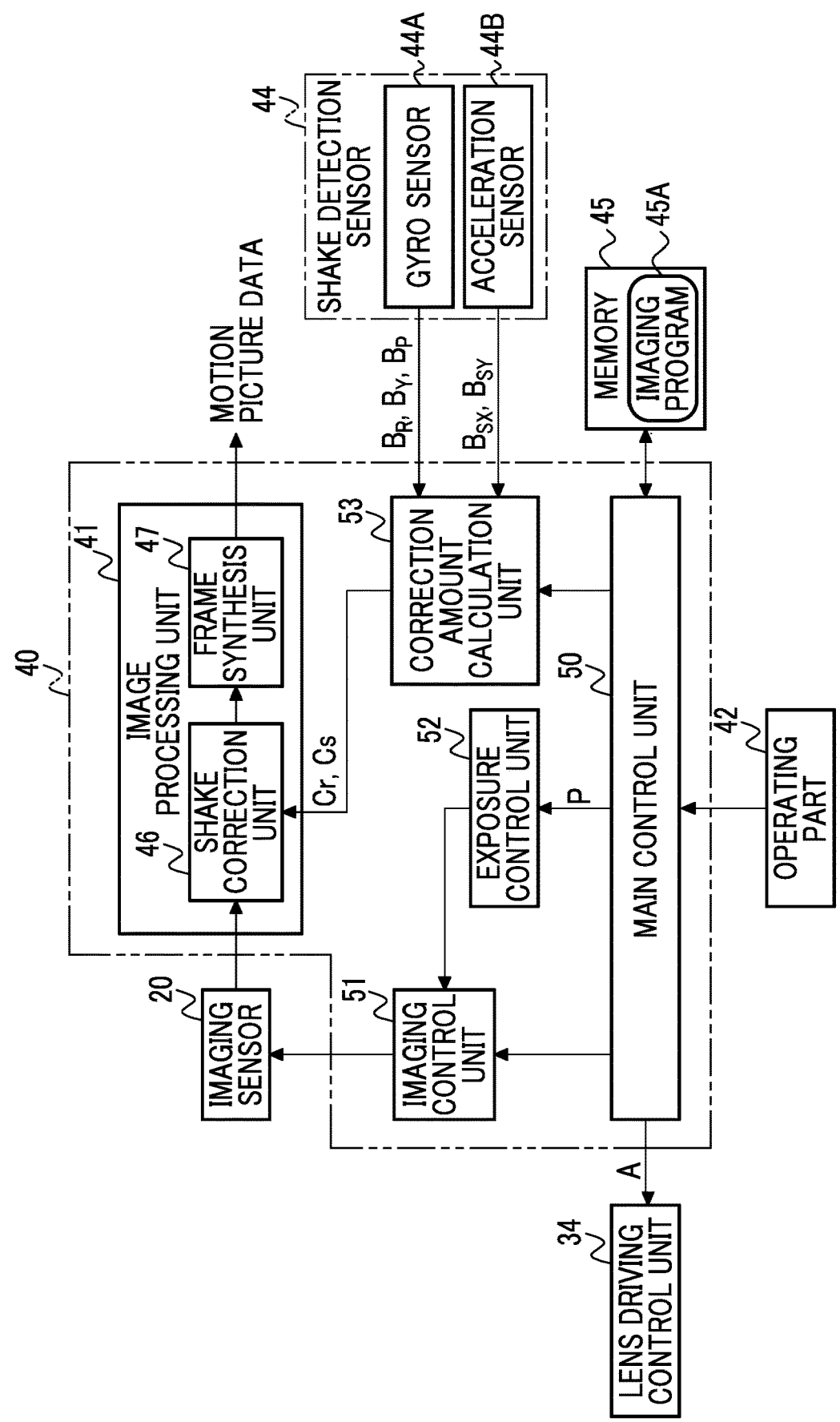
FIG. 4 is a block diagram showing an example of a functional configuration of a processor and an image processing unit.

The shake detection sensor 44 is composed of, for example, a gyro sensor 44A and an acceleration sensor 44B (refer to FIG. 4). The gyro sensor 44A detects the rotational shake and the angular shake. The acceleration sensor 44B detects the translational shake. The shake detection sensor 44 outputs the detection signal of the detected shake to the processor 40. The shake detection sensor 44 is an example of a shake detection unit according to the technique of the present disclosure. It should be noted that the shake detection sensor 44 may be provided in the imaging lens 12. In such a case, the processor 40 may acquire a detected value of the amount of shake from the shake detection sensor 44 in the imaging lens 12 through the electrical contact 12B and the electrical contact 11B.

The image processing unit 41 is composed of, for example, a DSP. The image processing unit 41 performs various kinds of image processing on the image signal to generate image data in a predetermined file format (for example, JPEG format or the like). Further, the image processing unit 41 executes electronic shake correction processing and frame synthesis processing, to be described later, during motion picture imaging.

The display 15 displays an image on the basis of the image data which is generated by the image processing unit 41. The image includes a still picture, a motion picture, and a live view image. The live view image is an image that is displayed in real time on the display 15 by sequentially outputting the image data, which is generated by the image processing unit 41, to the display 15.

The image data, which is generated by the image processing unit 41, can be stored in an internal memory (not shown in the drawing) built in the body 11 or a storage medium (for example, the memory card) that can be attached to and detached from the body 11.

The operating part 42 includes the dial 13, the release button 14, and the instruction button 16 (refer to FIGS. 1 and 2) described above. The processor 40 controls each unit in the body 11 and the lens driving control unit 34 in the imaging lens 12 in response to an operation of the operating part 42.

(Processor Configuration)

FIG. 4 shows an example of functional configurations of the processor 40 and the image processing unit 41 as a part of the processor 40. The processor 40 implements various functional units by executing processing in accordance with the imaging program 45A stored in the memory 45. As shown in FIG. 4, for example, the processor 40 implements a main control unit 50, an imaging control unit 51, an exposure control unit 52, and a correction amount calculation unit 53.

The main control unit 50 comprehensively controls an operation of the imaging apparatus 10 on the basis of an instruction signal which is input from the operating part 42. The imaging control unit 51 controls the imaging sensor 20 to execute an imaging processing of causing the imaging sensor 20 to perform an imaging operation. The imaging control unit 51 drives the imaging sensor 20 in the still picture imaging mode or the motion picture imaging mode.

A user is able to perform selection between the still picture imaging mode and the motion picture imaging mode by the operating part 42. Further, a user is able to set the exposure value including the shutter speed and the F number by operating the operating part 42. The main control unit 50 supplies the exposure control unit 52 with a unit time P corresponding to the shutter speed (unit: second) which is set by the operating part 42. For example, the unit time P is equal to the shutter speed. The main control unit 50 inputs an F number A, which is set by the operating part 42, to the lens driving control unit 34.

Further, a user is able to select an automatic exposure mode by operating the operating part 42. In a case in which the automatic exposure mode is selected, the main control unit 50 obtains optimum values of the shutter speed and the F number by calculation using the program diagram and the luminance of the image signal obtained by the imaging sensor 20.

The exposure control unit 52 determines exposure start timing of the imaging sensor 20 on the basis of the unit time P supplied from the main control unit 50, and supplies the determined exposure start timing to the imaging control unit 51. The lens driving control unit 34 adjusts an opening diameter of the stop 33 (refer to FIG. 3) on the basis of the F number A supplied from the main control unit 50.

The correction amount calculation unit 53 calculates a correction amount for performing shake correction on the image signal, which is output from the imaging sensor 20, on the basis of the shake detection signal which is output from each of the gyro sensor 44A and the acceleration sensor 44B included in the shake detection sensor 44. The correction amount calculation unit 53 supplies the calculated correction amount to the image processing unit 41.

The gyro sensor 44A is an angular velocity sensor that detects the rotational shake and the angular shake, and outputs an angular velocity signal as a detected value. The gyro sensor 44A outputs an angular velocity signal BR that indicates rotational shake and angular velocity signals $B_Y$ and $B_P$ that indicate angular shake. The angular velocity signal $B_Y$ indicates the angular shake in the yaw direction. The angular velocity signal $B_P$ indicates the angular shake in the pitch direction.

The acceleration sensor 44B outputs an acceleration signal as a detected value of the translational shake. The acceleration sensor 44B outputs an acceleration signal $B_{SX}$ that indicates the translational shake in the X direction and an acceleration signal $B_{SY}$ that indicates the translational shake in the Y direction.

In the present embodiment, the shake detection axes are five axes in the roll direction, the yaw direction, the pitch direction, the X direction, and the Y direction. In contrast, the shake correction axes are three axes in the roll direction, the X direction, and the Y direction. Therefore, in the yaw direction and the pitch direction, the angular shake cannot be directly corrected on the basis of the angular velocity signals $B_Y$ and $B_P$ that indicate the angular shake. In the present embodiment, the angular shake in the yaw direction is included in the translational shake in the X direction and is corrected, and the angular shake in the pitch direction is included in the translational shake in the Y direction and is corrected.

The correction amount calculation unit 53 calculates a rotation amount Cr for correcting rotational shake on the basis of the angular velocity signal $B_R$. Further, the correction amount calculation unit 53 calculates a shift amount Cs for correcting translational shake on the basis of the acceleration signals $B_{SX}$ and $B_{SY}$ and the angular velocity signals $B_Y$ and $B_P$.

The image processing unit 41 is configured to have a shake correction unit 46 that performs electronic shake correction processing during motion picture imaging, and a frame synthesis unit 47 that synthesizes a plurality of frames in which the shake is corrected. The frame refers to an image represented by an image signal which is output from the imaging sensor 20 during one frame period. The shake correction processing is an example of the correction processing according to the technique of the present disclosure.

The shake correction unit 46 corrects translational shake and rotational shake by changing between frames a cutout region that partially cuts out an image from an imaging region of the imaging sensor 20. The modification example of the cutout region includes shifting and rotation of the cutout region. Therefore, it is necessary for the shake correction unit 46 to perform arithmetic processing such as projective transformation or affine transformation on the signal included in the cutout region.

The frame synthesis unit 47 performs frame synthesis processing of generating motion picture data having a second frame rate lower than that of the first frame rate corresponding to the driving frequency of the imaging sensor 20 by synthesizing a plurality of frames in which the shake correction unit 46 corrects the shake. The frame synthesis processing is an example of the generation processing according to the technique of the present disclosure.

(Structure of Correction Amount Calculation Unit)

Figure 5:
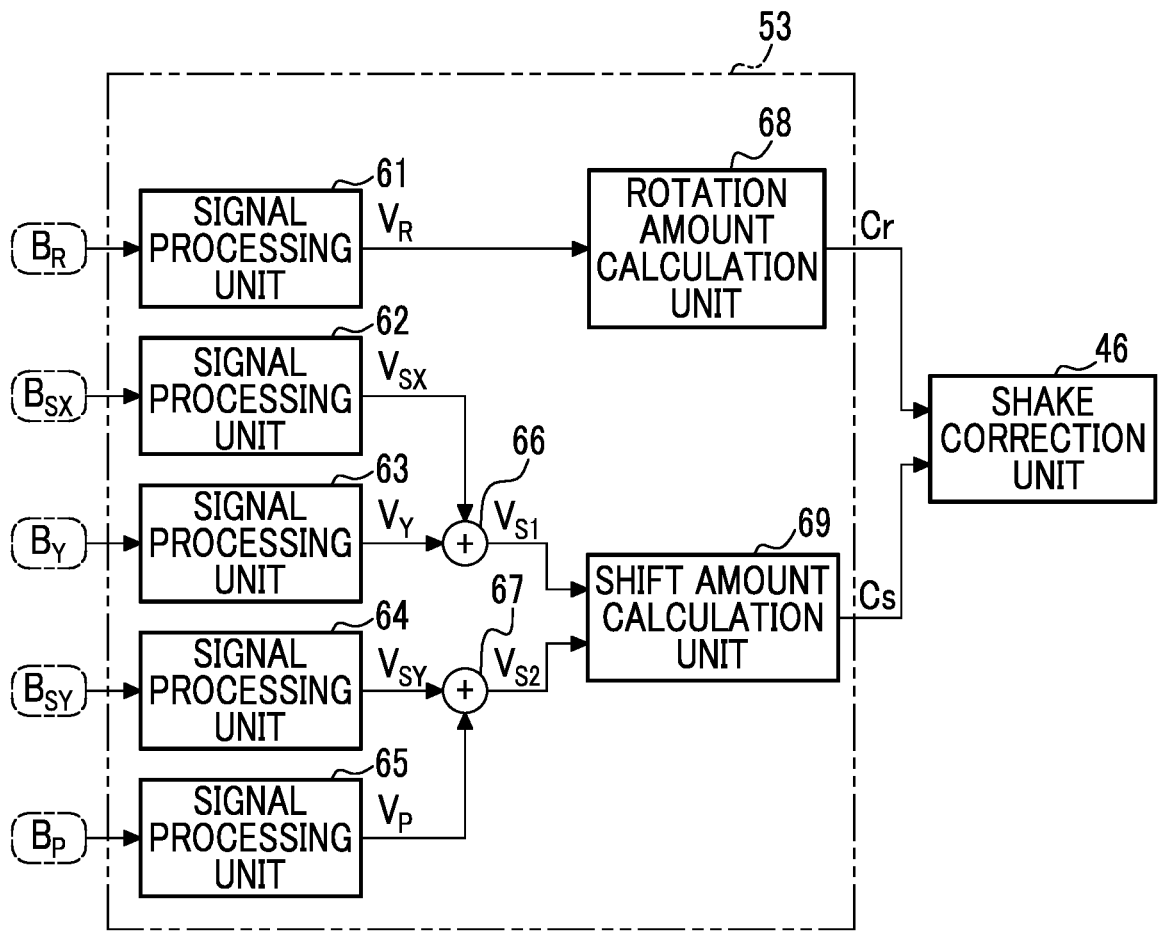
FIG. 5 is a block diagram showing an example of a configuration of a correction amount calculation unit.
Figure 6:
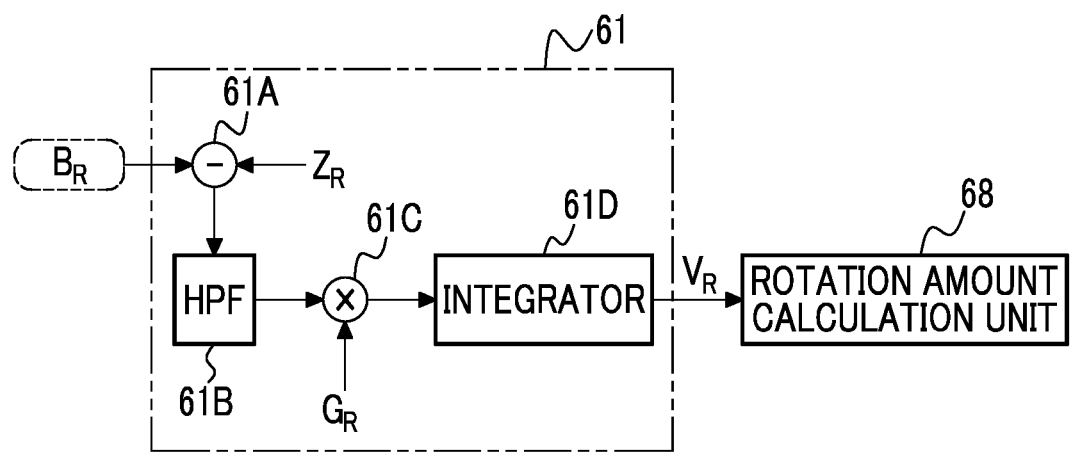
FIG. 6 is a diagram showing an example of a configuration of a signal processing unit.
Figure 7:
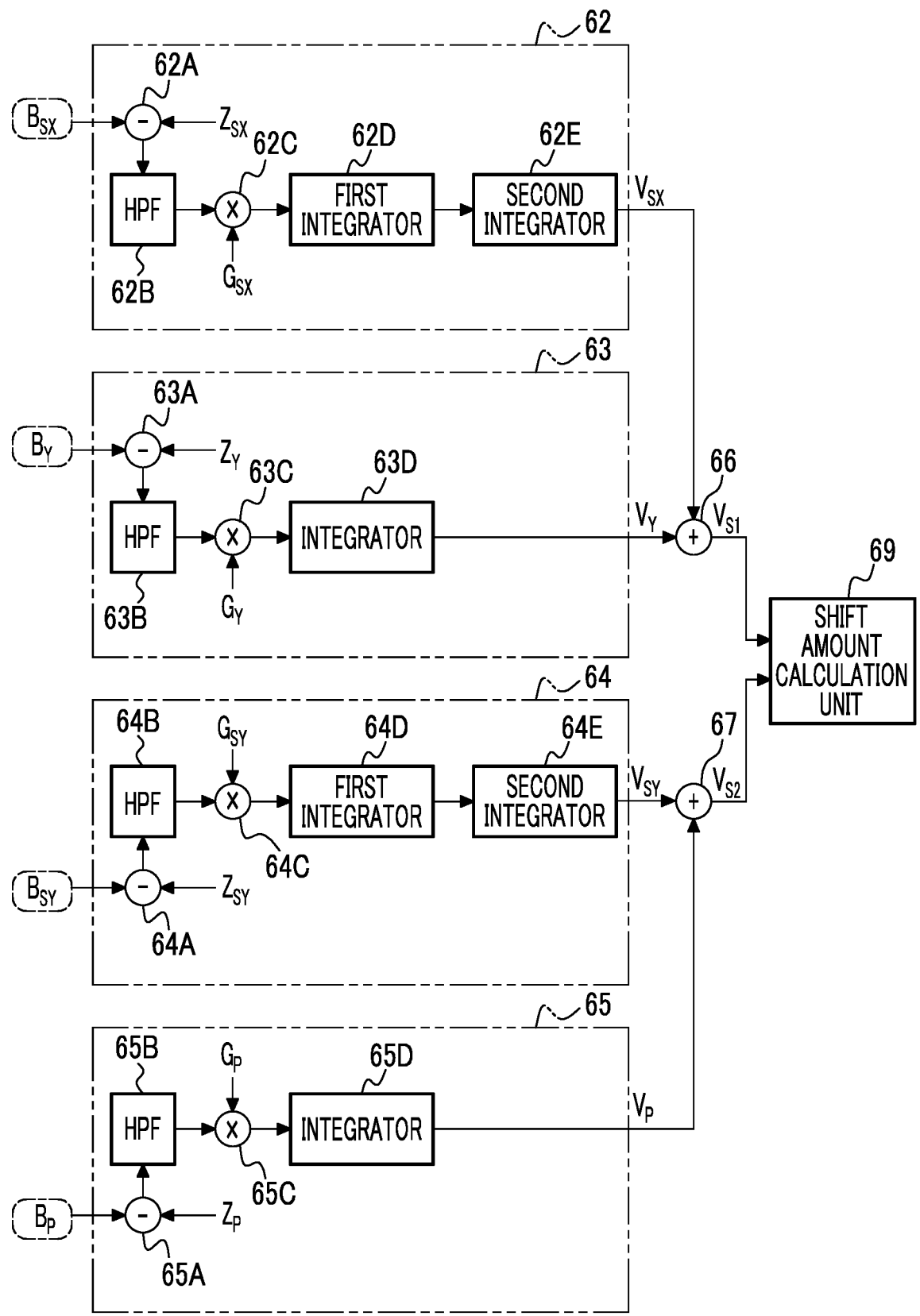
FIG. 7 is a diagram showing an example of a configuration of the signal processing unit.

FIGS. 5 to 7 show an example of a configuration of the correction amount calculation unit 53. As shown in FIG. 5, the correction amount calculation unit 53 is composed of signal processing units 61 to 65, adders 66 and 67, a rotation amount calculation unit 68, and a shift amount calculation unit 69.

The signal processing unit 61 converts the angular velocity signal $B_R$ that indicates rotational shake into a correction amount $V_R$ that indicates angular information, and outputs the angular velocity signal $B_R$ to the rotation amount calculation unit 68. As shown in FIG. 6, the signal processing unit 61 has, for example, a subtractor 61A, a high-pass filter (hereinafter referred to as HPF) 61B, a multiplier 61C, and an integrator 61D.

The subtractor 61A performs offset correction by subtracting a zero point correction value $Z_R$ from the angular velocity signal $B_R$. The zero point correction value $Z_R$ is an output value from the gyro sensor 44A in a case where the gyro sensor 44A remains stationary. The HPF 61B cannot be completely removed by the offset correction using the subtractor 61A, and the residual DC component is removed.

The multiplier 61C performs gain correction by multiplying an output signal from the HPF 61B by a gain value $G_R$. The gain value $G_R$ is a value determined by either a focal length of the imaging lens 12 or a sensitivity of the gyro sensor 44A. In s case of the rotational shake, the gain value $G_R$ does not depend on the focal length of the imaging lens 12. The integrator 61D generates the correction amount $V_R$ that indicates the angular information by integrating an output signal from the multiplier 61C, and outputs the correction amount $V_R$ to the rotation amount calculation unit 68.

The rotation amount calculation unit 68 calculates the rotation amount Cr on the basis of the correction amount $V_R$ which is input from the signal processing unit 61, and inputs the calculated rotation amount Cr to the shake correction unit 46 (refer to FIG. 4). The shake correction unit 46 rotates the cutout region by an angle corresponding to the input rotation amount Cr.

The signal processing unit 62 converts an acceleration signal $B_{SX}$, which indicates the translational shake in the X direction, into a correction amount $V_{SX}$, which indicates the positional information, and outputs the correction amount $V_{SX}$. The signal processing unit 63 converts the angular velocity signal $B_Y$, which indicates the angular shake in the yaw direction, into a correction amount $V_Y$, which indicates the angular information, and outputs the correction amount $V_Y$. The adder 66 adds the correction amount $V_{SX}$ which is output from the signal processing unit 62 and the correction amount $V_Y$ which is output from the signal processing unit 63, and outputs the added value as a total correction amount $V_{S1}$ to the shift amount calculation unit 69.

The signal processing unit 64 converts the acceleration signal $B_{SY}$, which indicates the translational shake in the Y direction, into the correction amount $V_{SY}$, which indicates the positional information, and outputs the correction amount $V_{SY}$. The signal processing unit 65 converts an angular velocity signal $B_P$, which indicates the angular shake in the pitch direction into a correction amount $V_P$, which indicates the angular information, and outputs the correction amount $V_P$. The adder 67 adds the correction amount $V_{SY}$ which is output from the signal processing unit 64 and the correction amount $V_P$ which is output from the signal processing unit 65, and outputs the added value as a total correction amount $V_{S2}$ to the shift amount calculation unit 69.

As shown in FIG. 7, the signal processing unit 62 includes, for example, a subtractor 62A, an HPF 62B, a multiplier 62C, a first integrator 62D, and a second integrator 62E. The signal processing unit 62 has two integrators including a first integrator 62D and a second integrator 62E, in order to convert an acceleration signal $B_{SX}$, which is a second-order differential value of the positional information, into the positional information.

Similar to the signal processing unit 61 shown in FIG. 6, the subtractor 62A performs offset correction by subtracting a zero point correction value $Z_{SX}$ from the acceleration signal $B_{SX}$. The zero point correction value $Z_{SX}$ is an output value from the acceleration sensor 44B in a case where the acceleration sensor 44B remains stationary. The HPF 62B removes the residual DC component by the offset correction performed by the subtractor 62A. The multiplier 62C performs gain correction by multiplying the output signal from the HPF 62B by a gain value $G_{SX}$. The gain value $G_{SX}$ is a value determined by either a focal length of the imaging lens 12 or a sensitivity of the acceleration sensor 44B.

The first integrator 62D outputs an integrated value which is obtained by integrating the output signals from the multiplier 62C. The second integrator 62E generates and outputs a correction amount $V_{SX}$ that indicates positional information by integrating an integrated value which is output from the first integrator 62D.

The signal processing unit 63 has, for example, a subtractor 63A, an HPF 63B, a multiplier 63C, and an integrator 63D. A configuration of the signal processing unit 63 is the same as a configuration of the signal processing unit 61 shown in FIG. 6.

The signal processing unit 64 includes, for example, a subtractor 64A, an HPF 64B, a multiplier 64C, a first integrator 64D, and a second integrator 64E. A configuration of the signal processing unit 64 is the same as a configuration of the signal processing unit 62.

The signal processing unit 65 has, for example, a subtractor 65A, an HPF 65B, a multiplier 65C, and an integrator 65D. A configuration of the signal processing unit 65 is the same as a configuration of the signal processing unit 61 shown in FIG. 6.

The shift amount calculation unit 69 calculates a shift amount that indicates a shift amount in the X direction and the Y direction on the basis of the total correction amount $V_{S1}$ which is input from the adder 66 and the total correction amount $V_{S2}$ which is input from the adder 67, and inputs the calculated shift amount Cs to the shake correction unit 46 (refer to FIG. 4). The shake correction unit 46 moves the cutout region in a distance and a direction corresponding to the input shift amount Cs.

(Shake Correction Processing)

Figure 8:
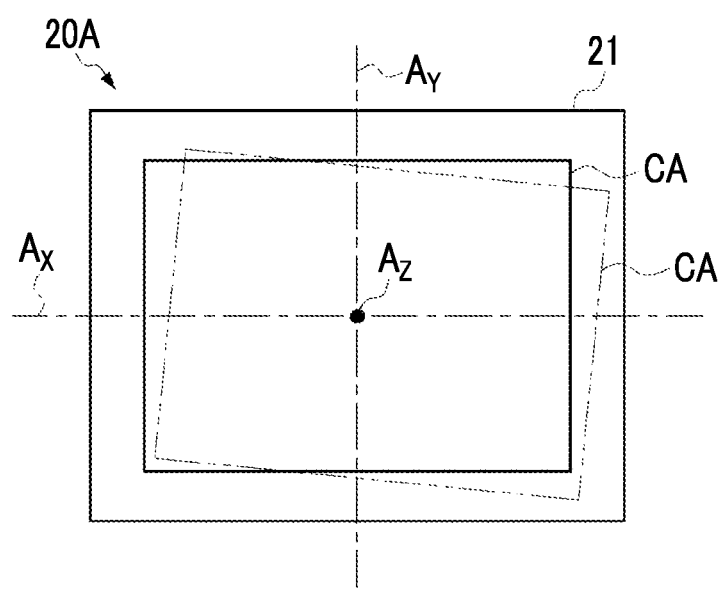
FIG. 8 is a diagram showing an example of shake correction processing.

FIG. 8 shows an example of shake correction processing performed by the shake correction unit 46. In FIG. 8, the reference numeral 21 indicates an imaging region on a light-receiving surface 20A of the imaging sensor 20. The imaging region 21 is, for example, an effective pixel region. Further, the reference numeral CA is a cutout region that indicates a region for partially cutting out an image from the entire image corresponding to the imaging region 21. The cutout region CA is smaller than the imaging region 21.

The image is cut out, for example, by storing the entire image data corresponding to the imaging region 21 in the memory and then reading out the data corresponding to the cutout region CA from the entire image data which is stored in the memory.

The shake correction unit 46 shifts and/or rotates the cutout region CA in the imaging region 21. Specifically, the shake correction unit 46 shifts the cutout region CA in the X direction and the Y direction in accordance with the shift amount Cs which is input from the shift amount calculation unit 69 and the rotation amount which is input from the rotation amount calculation unit 68, and rotates the cutout region CA in the roll direction in accordance with the amount Cr. The two-dot chain line in FIG. 8 indicates an example of the cutout region CA after the shift and the rotation.

The shake correction unit 46 changes the cutout region CA each time an image signal for one frame is output from the imaging sensor 20. Consequently, the shake correction unit 46 corrects the translational shake and the rotational shake by changing the cutout region CA between the frames.

(Frame Synthesis Processing)

Figure 9:
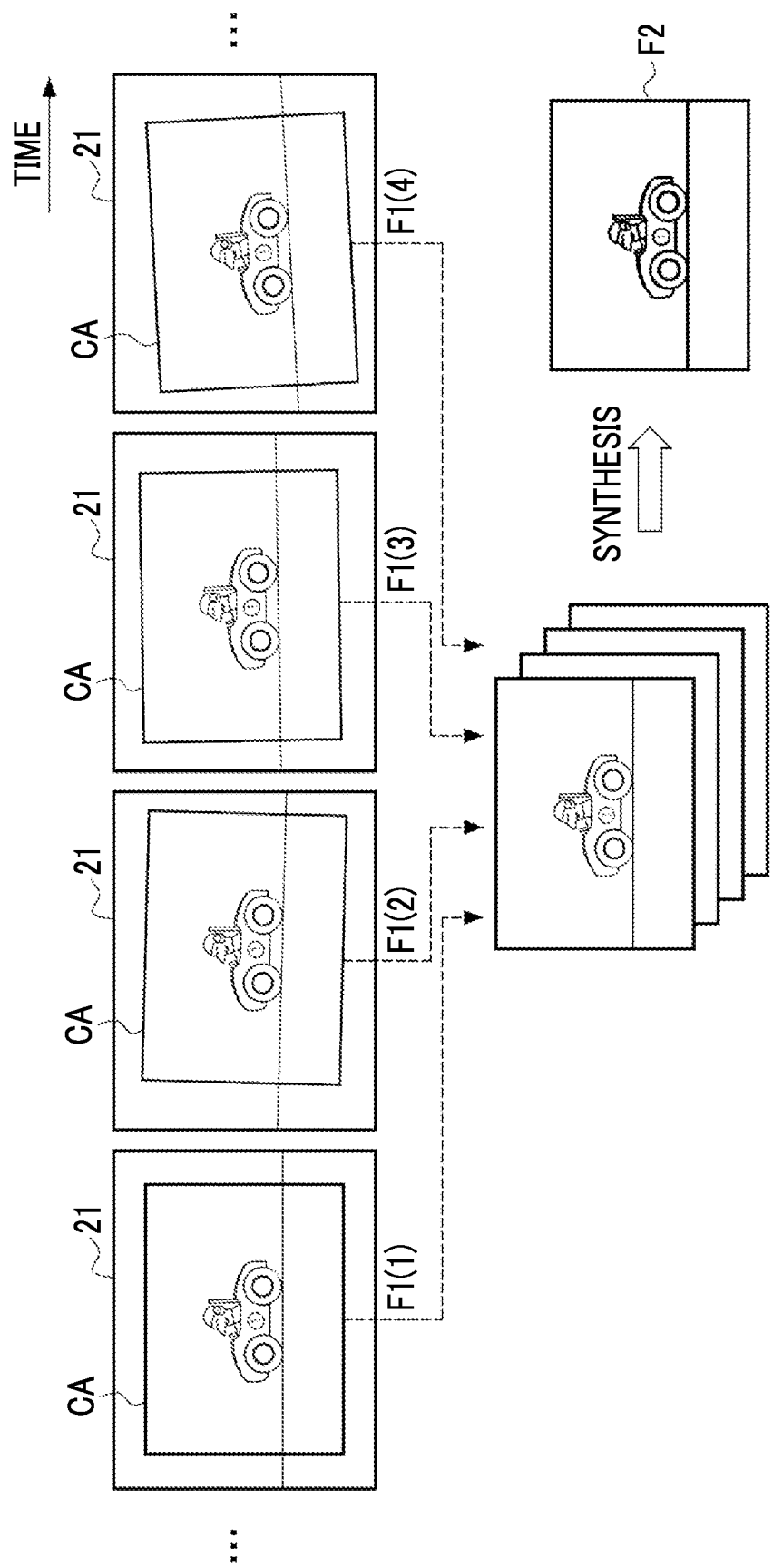
FIG. 9 is a diagram showing an example of frame synthesis processing.

FIG. 9 shows an example of frame synthesis processing performed by the frame synthesis unit 47. The imaging sensor 20 outputs an image signal at the first frame rate. The shake correction unit 46 cuts out an image from the cutout region CA while changing the cutout region CA for each frame. Hereinafter, the frame which is acquired at the first frame rate is referred to as a first frame.

FIG. 9 shows an example of synthesis of one second frame by synthesizing four first frames. The first frames F1(1) to F1(4) are images of four continuous frames which are cut out by the shake correction unit 46 (that is, on which shake correction is performed). The frame synthesis unit 47 generates one second frame F2 by performing addition processing of the frames F1(1) to F1(4) for each corresponding pixel.

In the present example, since the second frame F2 is generated by synthesizing four first frames F1(1) to F1(4), a frame rate of the second frame F2 (hereinafter referred to as a second frame rate) is ¼ times the first frame rate. The plurality of second frames F2 generate the motion picture data at the second frame rate. For example, the first frame rate is 240 fps (frames per second), and the second frame rate is 60 fps.

Since the second frame F2 constituting the motion picture data is generated by synthesizing the plurality of first frames F1(1) to F1(4) for which shake correction is performed, the influence of shake is suppressed and a bright image is obtained.

In the case of electronic shake correction, there is a technical problem that it is difficult to correct shake that occurs during an exposure time of an image of each frame. However, in the case of motion picture data obtained through imaging at a high-speed first frame rate such as 240 fps, the exposure time for each frame is extremely short. Therefore, it is possible to minimize the amount of shake that occurs during the exposure time. Therefore, since large shake is less likely to occur between the frames, an accuracy of the electronic camera shake correction is improved for the entire motion picture data. The motion picture data at the second frame rate of 60 fps generated by the synthesis is a motion picture in which the influence of the shake is suppressed as compared with the motion picture data obtained through imaging at 60 fps without the synthesis.

The luminance of the second frame F2 constituting the motion picture data may be adjusted by adjusting a gain in the image processing unit 41.

(Configuration of Imaging Sensor)

Figure 10:
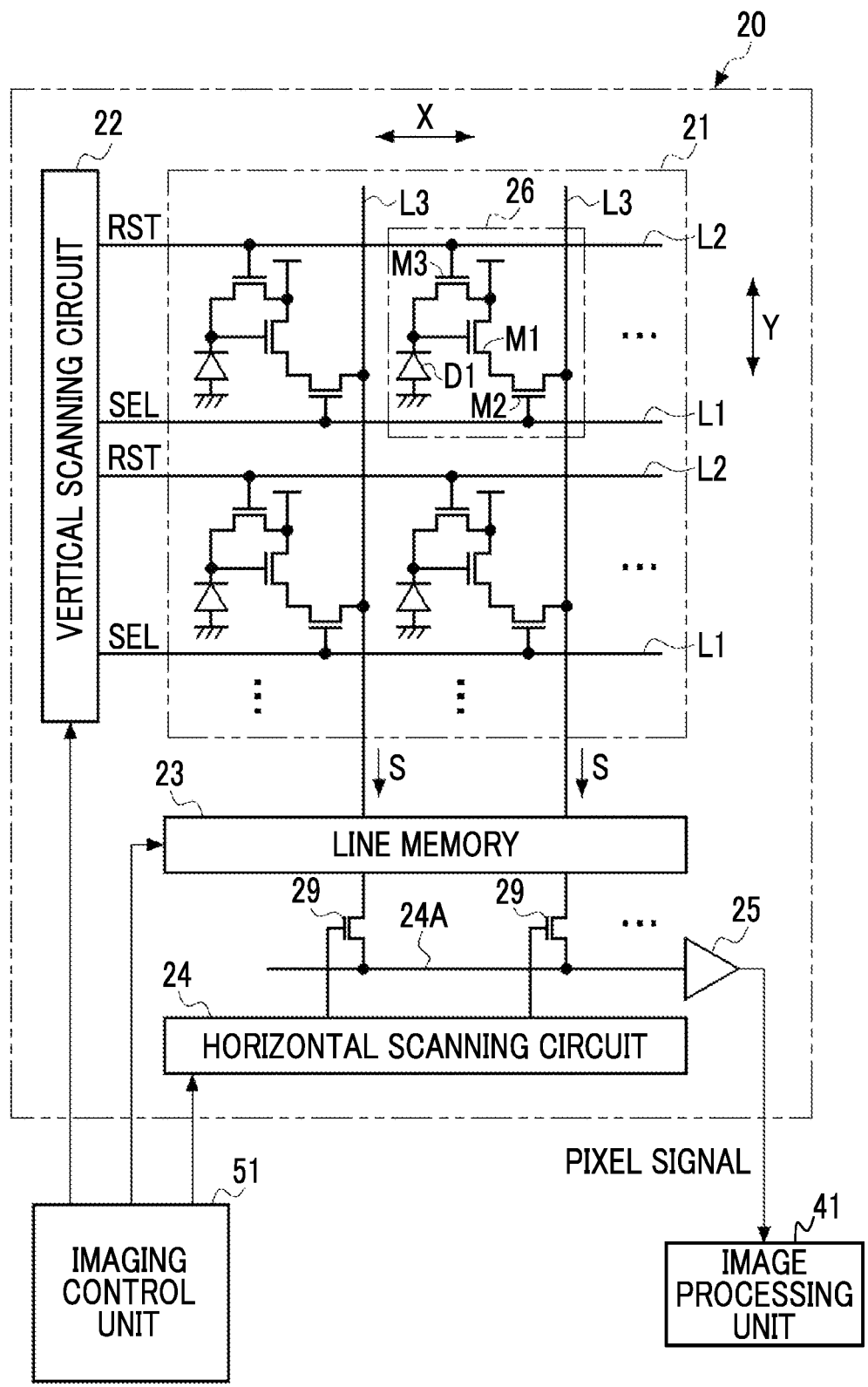
FIG. 10 is a diagram showing an example of a configuration of an imaging sensor.

FIG. 10 shows an example of a configuration of the imaging sensor 20. The imaging sensor 20 shown in FIG. 10 is a CMOS image sensor. The imaging sensor 20 includes the imaging region 21, a vertical scanning circuit 22, a line memory 23, a horizontal scanning circuit 24, and an output amplifier 25.

In the imaging region 21, a plurality of pixels 26 are arranged in a two-dimensional matrix along the X direction and the Y direction. Further, in the imaging region 21, a plurality of row selection lines L1 and a plurality of row reset lines L2 are wired along the X direction, and a plurality of column signal lines L3 are wired along the Y direction. The pixel 26 is connected to the row selection line L1, the row reset line L2, and the column signal line L3. Hereinafter, a plurality of pixels 26 arranged in the X direction may be simply referred to as "row". It should be noted that some of the plural pixels 26 may be phase difference pixels for performing focus adjustment.

The pixel 26 has a photodiode D1, an amplifier transistor M1, a pixel selection transistor M2, and a reset transistor M3. The photodiode D1 performs photoelectric conversion of incident light to generate a signal charge corresponding to an amount of the incident light and accumulate the generated signal charge. The amplifier transistor M1 generates a voltage (hereinafter referred to as a pixel signal S) corresponding to an amount of the signal charge accumulated in the photodiode D1.

The pixel selection transistor M2 is controlled by the vertical scanning circuit 22 through the row selection line L1 and outputs the pixel signal S, which is generated by the amplifier transistor M1, to the column signal line L3. The reset transistor M3 is controlled by the vertical scanning circuit 22 through the row reset line L2, and discards the signal charge, which is accumulated in the photodiode D1, to the power supply line. Hereinafter, discarding of the signal charge from the photodiode D1 is referred to as reset of the pixel 26.

In the CMOS image sensor, readout of the pixel signal S from the pixel 26 is a non-destructive readout that is not affected by the signal charge accumulated in the pixel 26. Therefore, it is necessary to reset the pixel 26 after the readout of the pixel signal S.

The vertical scanning circuit 22 generates a row selection signal SEL and a reset signal RST on the basis of the timing signal which is input from the imaging control unit 51. In the signal readout operation, the vertical scanning circuit 22 provides the row selection signal SEL to the row selection line L1 to output the pixel signal S from the pixel 26, which is connected to the row selection line L1, to the column signal line L3.

Further, the vertical scanning circuit 22 resets the pixel 26, which is connected to the row reset line L2, by giving the reset signal RST to the row reset line L2 during the reset operation. For example, the pixel 26 connected to the row reset line L2 in the nth row is reset while the pixel signal S is being read out from the pixel 26 which is connected to the row selection line L1 in the n+1th row.

The line memory 23 stores the pixel signal S which is output from the pixel 26 for one line. The line memory 23 is constituted of a capacitor or the like. The line memory 23 is connected to the horizontal output line 24A through a transistor 29 as a switch. The output amplifier 25 is connected to the end part of the horizontal output line 24A. The horizontal scanning circuit 24 sequentially outputs the pixel signals S for one line stored in the line memory 23 to the horizontal output line 24A by performing horizontal scanning in which the transistors 29 are sequentially selected. The pixel signal S, which is output to the horizontal output line 24A, is output to the external image processing unit 41 as an image signal through the output amplifier 25.

The imaging control unit 51 controls operations of the vertical scanning circuit 22, the line memory 23, and the horizontal scanning circuit 24 (refer to FIG. 4). The imaging control unit 51 controls the vertical scanning circuit 22 to output the pixel signal S while sequentially selecting the row selection line L1 one row at a time. Further, the imaging control unit 51 controls the vertical scanning circuit 22 to reset the pixels 26 while sequentially selecting the row reset line L2 one row at a time. As described above, the imaging control unit 51 controls the readout and reset of the image signal from the imaging sensor 20 by the "sequential readout method" and the "sequential reset method".

In the motion picture imaging mode, the imaging control unit 51 drives the imaging sensor 20 at the first frame rate which is supplied from the main control unit 50. The imaging control unit 51 causes the imaging sensor 20 to repeatedly execute operations of reading out and resetting the image signal in a period corresponding to the first frame rate.

A configuration of the imaging sensor 20 is not limited to the configuration shown in FIG. 10. For example, the imaging sensor 20 may be provided with an A/D converter.
(Imaging Operation)

Figure 11:
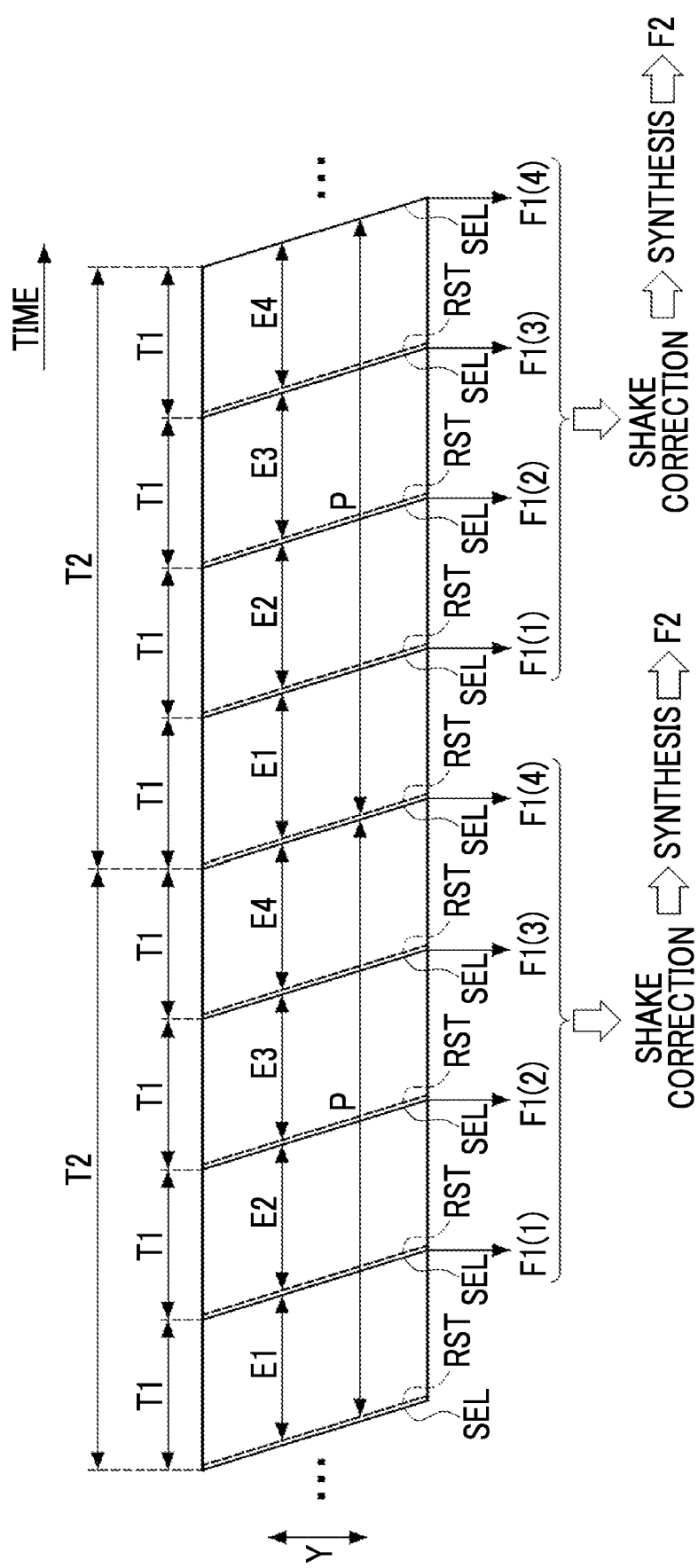
FIG. 11 is a diagram showing an example of an imaging operation of the imaging sensor.

FIG. 11 shows an example of an imaging operation of the imaging sensor 20 in the motion picture imaging mode. In FIG. 11, T1 is the first frame period which is represented by an inverse of the first frame rate. T2 is a second frame period which is represented by an inverse of the second frame rate. For example, in a case where the first frame rate is 240 fps, T1=1/240 second. In a case where the second frame rate is 60 fps, T2=1/60 second.

The first frame period T1 is defined by a period in which the row selection signal SEL is input from the vertical scanning circuit 22, on the same row selection line L1. Consequently, an image signal is output from the imaging sensor 20 every first frame period T1.

In the present embodiment, the second frame period T2 includes four first frames F1(1) to F1(4). F1(n) indicates the second frame period T2, which is an nth first frame after the start of the second frame period T2. Here, n is a positive integer.

The reference numerals E1 to E4 indicate respective exposure times for the first frames F1(1) to F1(4). Each of the exposure times E1 to E4 is a time (that is, a charge accumulation time) from the input of the reset signal RST to the input of the row selection signal SEL for each row. In the present embodiment, the exposure period is shifted for each row. Consequently, the imaging sensor 20 performs the exposure with the electronic shutter of the focal plane type.

In FIG. 11, all the exposure times E1 to E4 are the same and are equal to the first frame period T1. Consequently, the exposure times E1 to E4 shown in FIG. 11 are the longest exposure times with the electronic shutter fully opened.

The first frames F1(1) to F1(4) are synthesized with the frame synthesis unit 47 after the shake correction is performed by the shake correction unit 46. Therefore, the first frames F1(1) to F1(4) become the second frame F2.

The second frame F2 is generated for each second frame period T2. Since the second frame F2 is an image obtained by synthesizing four first frames F1(1) to F1(4) imaged at the same exposure time, the luminance corresponds to an image captured during four times the exposure time.

The imaging operation shown in FIG. 11 is executed in a case where the unit time P corresponding to the shutter speed is a maximum value which is settable. In such a case, the unit time P is equal to the second frame period T2.
(Exposure Control)

Next, the control of the exposure time performed by the exposure control unit 52 will be described. The exposure control unit 52 determines the exposure start timing, on the basis of the unit time P which is supplied from the main control unit 50. Specifically, the exposure control unit 52 determines the exposure start timing such that a sum of the exposure times of the first frames is equal to the unit time P. The exposure control unit 52 controls the reset timing of the imaging sensor 20 through the imaging control unit 51, on the basis of the determined exposure start timing.

More specifically, in a case where the maximum n satisfying Expression (1) is m, the exposure control unit 52 determines the exposure start timing (that is, the reset timing) such that the exposure time for the mth first frame F1(m) is shorter than the exposure time for the (m+1)th first frame F1(m+1).

$$P < 1/V - (n-1)/(V \times N) \quad (1)$$

Here, V is the second frame rate. N is a value which is obtained by dividing the first frame rate by the second frame rate. Consequently, N indicates the number of first frames in the second frame period T2. n is a positive integer.

The exposure control unit 52 makes the sum of respective exposure times for the mth first frame F1(m) to the Nth first frame F1(N) equal to the unit time P. Further, it is preferable that the exposure control unit 52 makes the exposure time for the mth first frame F1(m) shorter than the respective exposure times for the (m+1)th to Nth first frames F1(m+1) to F1(N). Specifically, it is preferable that the exposure time for the mth first frame F1(m) is made shorter than the first frame period T1, and the respective exposure times for the (m+1)th first frame F1(m+1) to the Nth first frame F1(N) are made equal to the first frame period T1. In the present embodiment, the respective exposure times for the mth first frame F1(m) to the Nth first frame F1(N) are temporally continuous.

The images of the mth to Nth first frames F1(m) to F1(N) among the 1st to Nth first frames F1(1) to F1(N) are subjected to shake correction by the shake correction unit 46, and are then synthesized by the frame synthesis unit 47. Thereby, the second frame F2 constituting the motion picture data is obtained. Consequently, in a case where m≥2, the 1st first frame F1(1) to the (m−1)th first frame F1(m−1) is not used in generating the motion picture data.

For example, in a case where the first frame rate is 240 fps and the second frame rate is 60 fps, V=240 fps and N=4. In such a case, for example, in a case where P=1/70 second, then m=1. Further, in a case where P=1/100 second, m=2.

Figure 12:
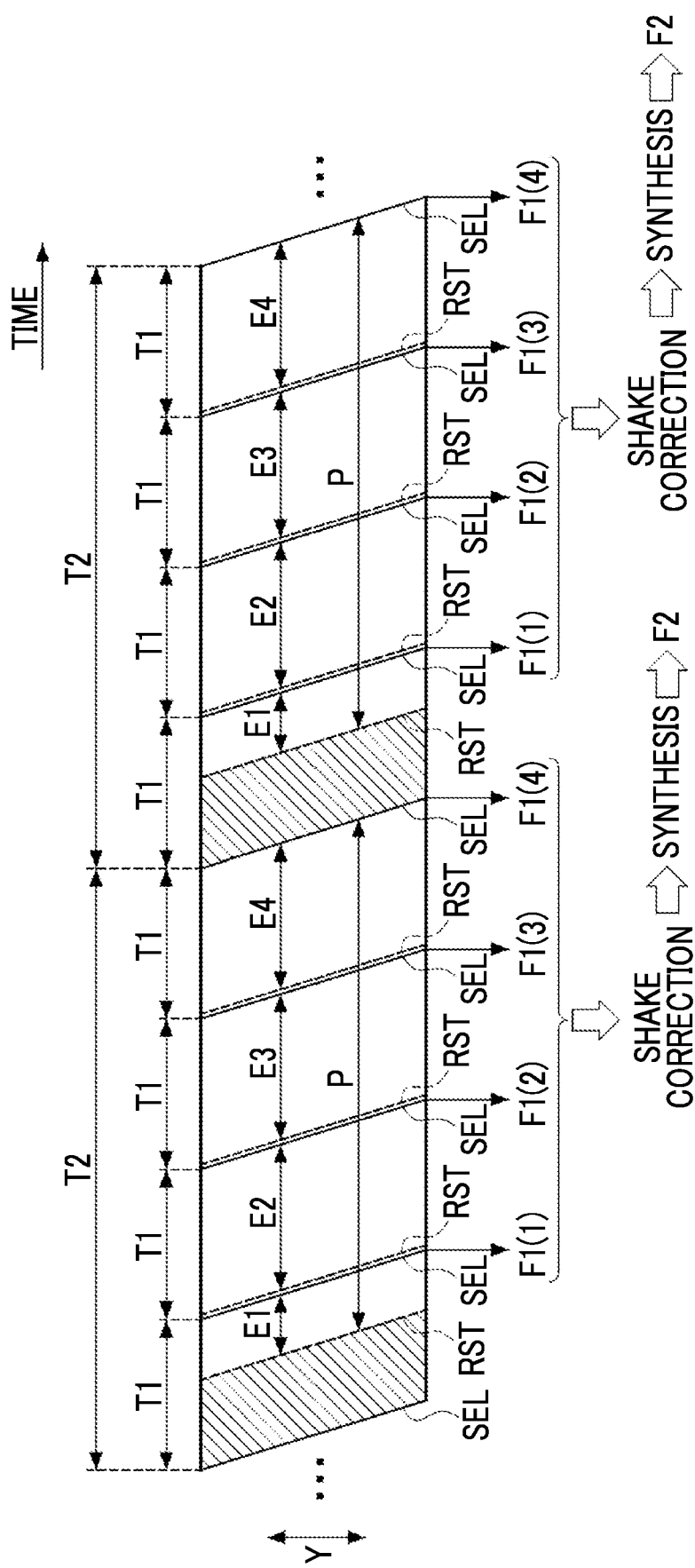
FIG. 12 shows an example of an imaging operation in a case where m=1.

FIG. 12 shows an example of an imaging operation in a case where m=1. In a case where m=1, the exposure control unit 52 delays the timing (that is, the reset timing) in which the vertical scanning circuit 22 generates the reset signal RST in the 1st first frame F1(1), and makes an exposure time E1 in the first frame F1(1) shorter than the first frame period T1.

The signal charge, which is accumulated in the pixel 26 (refer to FIG. 10) in the 1st first frame F1(1), is discarded by the reset. The pixel 26 starts accumulating a new signal charge after the signal charge is discarded by the reset. That is, the reset timing in the 1st first frame F1(1) corresponds to the exposure start timing. In the present example, a period from the start of the frame period of the 1st first frame F1(1) to the reset (the period indicated by the hatched shades in FIG. 12) is the light blocking period. The pixel 26 may be repeatedly reset during the light blocking period.

As described above, in a case where m=1, the second frame F2 is generated, on the basis of the four first frames F1(1) to F1(4). In the present example, the exposure times E1 to E4 are temporally continuous.

Figure 13:
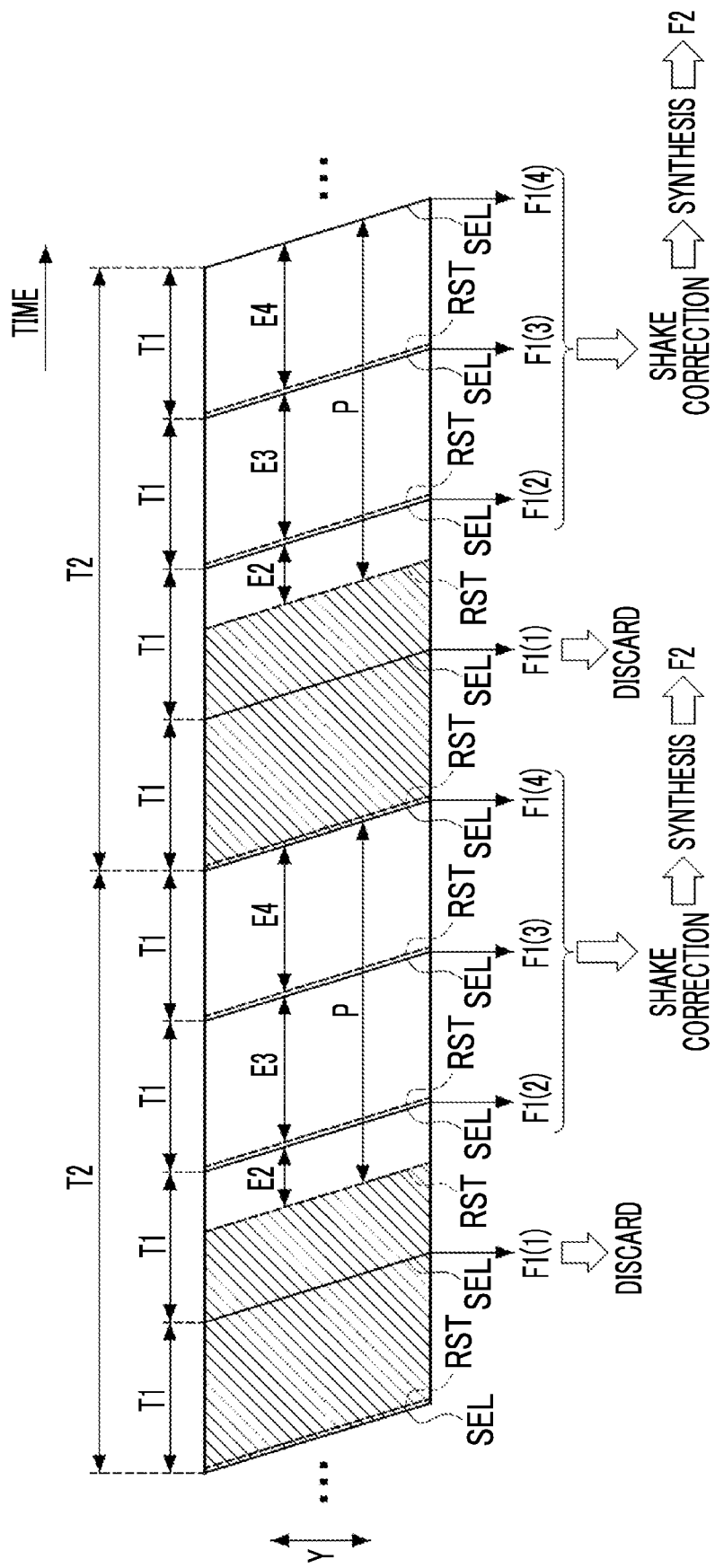
FIG. 13 shows an example of an imaging operation in a case where m=2.

FIG. 13 shows an example of the imaging operation in a case where m=2. In a case where m=2, the exposure control unit 52 delays the reset timing in the 2nd first frame F1(2) by the vertical scanning circuit 22 so as to make the exposure time E2 in the second frame F1(2) shorter than the first frame period T1.

In the present example, the 1st first frame F1(1) is discarded after being read out from the imaging sensor 20 or is discarded in the imaging sensor 20. That is, the 1st first frame F1(1) is not used in generating the motion picture data. In the present example, a frame period of the 1st first frame F1(1) and a period from the start of the frame period of the 2nd first frame F1(2) to the reset (a period indicated by hatched shades in FIG. 13) are set as light blocking periods. The pixel 26 may be repeatedly reset during the light blocking period.

As described above, in a case where m=2, the second frame F2 is generated, on the basis of the three first frames F1(2) to F1(4). In the present example, the exposure times E2 to E4 are temporally continuous.

The same applies to a case where m=3 and a case where m=4. In a case where m=3, the exposure control unit 52 makes the exposure time E3 for the 3rd first frame F1(3) shorter than the first frame period T1. In a case where m=4, the exposure time E4 for the 4th first frame F1(4) is made shorter than the first frame period T1.

As described above, in the exposure mode according to the present embodiment, the respective exposure times for the plurality of first frames are temporally continuous regardless of the length of the unit time P (refer to FIGS. 11 to 13). On the other hand, it is conceivable to distribute the exposure time to each of the plurality of first frames. In such a case, since the exposure times of the first frames are not continuous but discrete, movement of the subject may be discontinuous in a case where a fast-moving subject is imaged. In the exposure mode according to the present embodiment, the respective exposure times for the plurality of first frames are continuous in time. Therefore, it is possible to suppress the discontinuity of the movement of the subject while suppressing the influence of the shake.

Second Embodiment

Next, a second embodiment will be described. In the second embodiment, in addition to the first exposure mode, in the exposure mode according to the first embodiment, it is possible to execute a second exposure mode in which the exposure time is distributed to each of the plurality of first frames.

Figure 14:
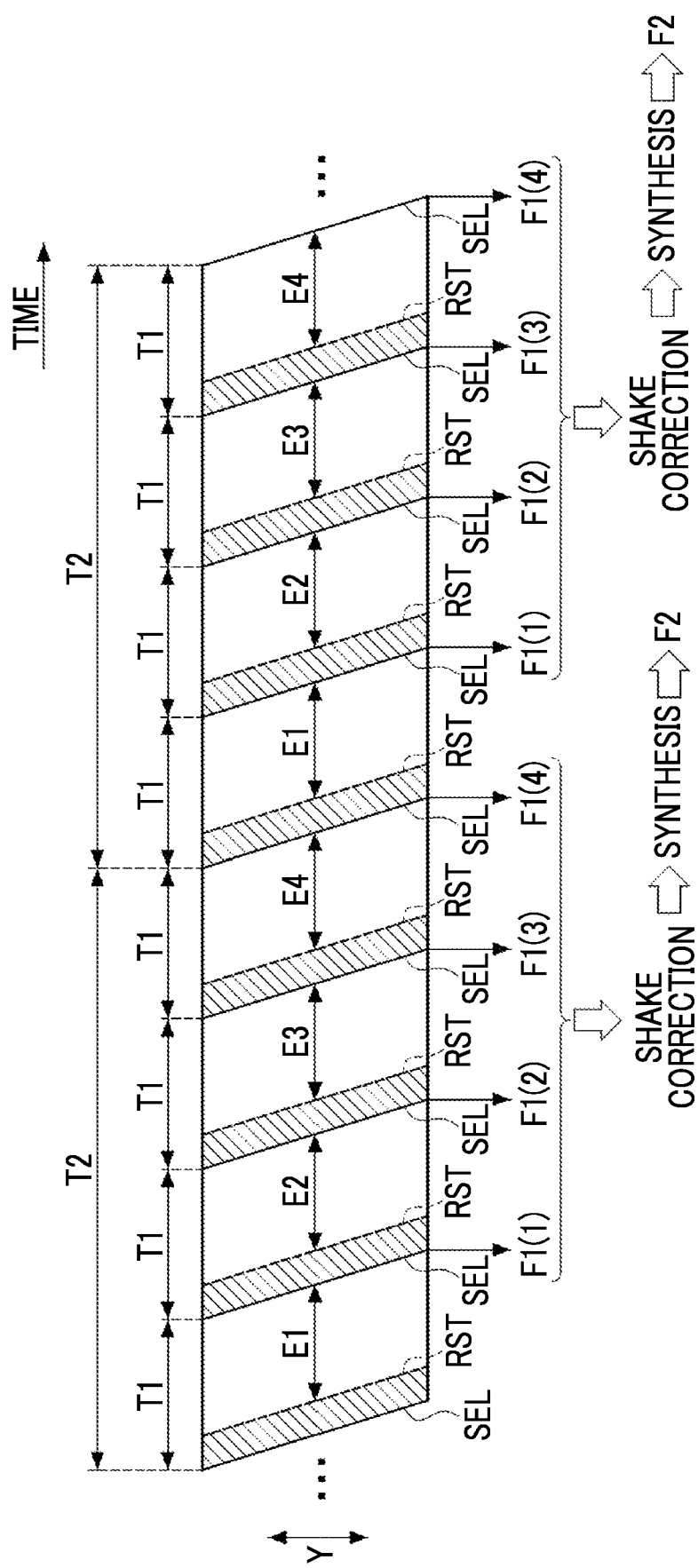
FIG. 14 is a diagram showing an example of a second exposure mode according to a second embodiment.

In the second exposure mode, the exposure control unit 52 sets a value, which is obtained by dividing the unit time P by the number of frames N of the first frame in the second frame period T2, as the respective exposure times for the plurality of first frames. In the present embodiment, as shown in FIG. 14, in the second exposure mode, the exposure times E1 to E4 are all the same. However, there may be a difference in each exposure time.

In the second exposure mode, the exposure times E1 to E4 are discrete. Thus, there is a possibility that the movement of the subject becomes discontinuous in a case of imaging a fast-moving subject as described above. However, in the second exposure mode, the unit time P is shortened, each of the exposure times E1 to E4 is shortened, and the number of first frames for generating the motion picture data is consistently constant. Therefore, it is possible to obtain a high shake suppression effect.

For example, it is preferable that the exposure control unit 52 performs switching between the first exposure mode and the second exposure mode, on the basis of the setting information which is set by a user using the operating part 42 and supplied from the main control unit 50.

Further, the exposure control unit 52 may select an appropriate exposure mode from the first exposure mode and the second exposure mode, on the basis of the detected value of the speed of movement of the subject or the amount of shake.

Figure 15:
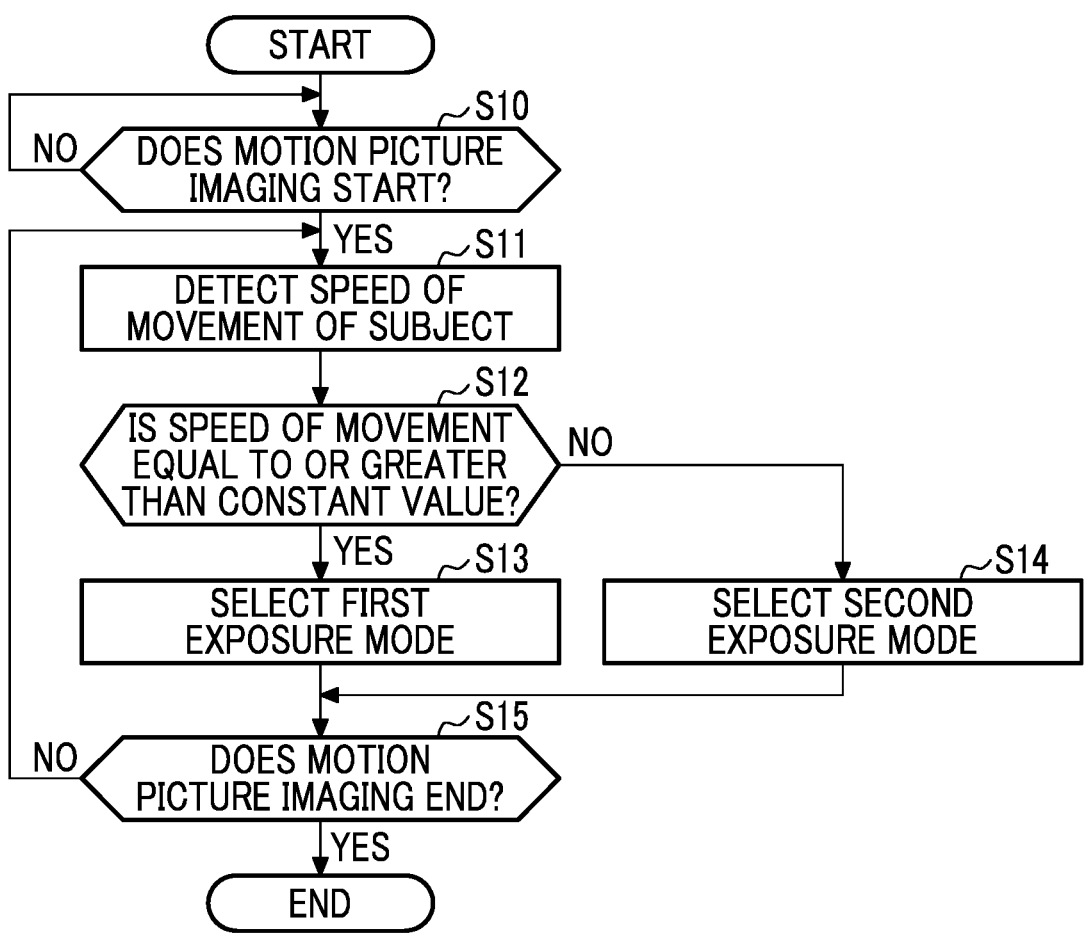
FIG. 15 is a flowchart showing an example of exposure mode selection processing.

FIG. 15 is an example of selection processing of selecting the exposure mode on the basis of the detected value of the speed of movement of the subject. As shown in FIG. 15, the exposure control unit 52 first determines whether or not the motion picture imaging is started by the imaging sensor 20 (step S10). In such a case, the motion picture imaging is performed using, for example, the second exposure mode as the initial exposure mode.

In a case where the exposure control unit 52 determines that the motion picture imaging is started (step S10: YES), the exposure control unit 52 detects the speed of movement of the subject (step S11). For example, the exposure control unit 52 detects the speed of movement of the subject by obtaining a movement vector of the subject between the first frames. It should be noted that the exposure control unit 52 may detect the speed of movement of the subject by obtaining the movement vector of the subject between the second frames.

Next, the exposure control unit 52 determines whether or not the speed of movement of the detected subject is equal to or greater than the constant value (step S12). In a case where the exposure control unit 52 determines that the speed of movement of the subject is equal to or greater than the constant value (step S12: YES), the exposure control unit 52 selects the first exposure mode (step S13). On the other hand, in a case where the exposure control unit 52 determines that the speed of movement of the subject is less than the constant value (step S12: NO), the exposure control unit 52 selects the second exposure mode (step S14). The imaging sensor 20 is exposed in the exposure mode selected by the exposure control unit 52.

After step S13 or step S14, the exposure control unit 52 determines whether or not the motion picture imaging is completed (step S15). In a case where the exposure control unit 52 determines that the motion picture imaging is not completed (step S15: NO), the exposure control unit 52 returns the processing to step S11 and executes step S11 again. On the other hand, in a case where the exposure control unit 52 determines that the motion picture imaging is completed (step S15: YES), the exposure control unit 52 ends the processing.

As described above, in a case where the speed of movement of the subject is high, the first exposure mode suitable for imaging of the fast-moving subject is selected. For example, in a case where a walking person is the subject or a user who holds the imaging apparatus 10 is walking, the second exposure mode is selected.

Figure 16:
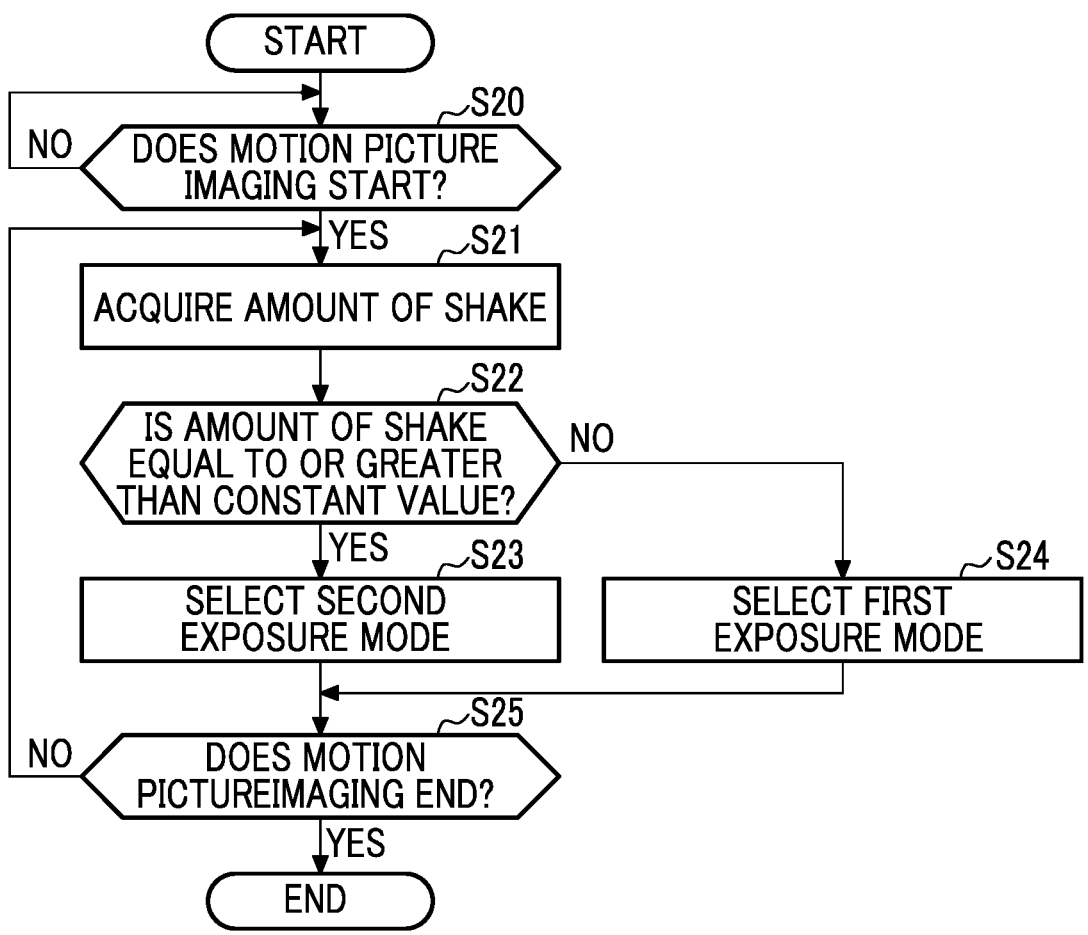
FIG. 16 is a flowchart showing an example of the exposure mode selection processing.

FIG. 16 is an example of the selection processing of selecting the exposure mode on the basis of an amount of shake. As shown in FIG. 16, first, the exposure control unit 52 determines whether or not the motion picture imaging is started by the imaging sensor 20 (step S20). In such a case, the motion picture imaging is performed using, for example, the second exposure mode as the initial exposure mode.

In a case where the exposure control unit 52 determines that the motion picture imaging is started (step S20: YES), the exposure control unit 52 acquires the amount of shake (step S21). For example, the exposure control unit 52 acquires a detected value of the amount of shake from the shake detection sensor 44. It should be noted that the exposure control unit 52 may acquire, as the amount of shake, the rotation amount calculated by the rotation amount calculation unit 68 and/or the shift amount calculated by the shift amount calculation unit 69 from the correction amount calculation unit 53.

Next, the exposure control unit 52 determines whether or not the acquired amount of shake is equal to or greater than the constant value (step S22). In a case where the rotation amount and the shift amount are acquired as the amount of shake, the exposure control unit 52 determines whether or not both or one of the rotation amount and the shift amount is equal to or greater than the constant value. In a case where the exposure control unit 52 determines that the amount of shake is equal to or greater than the constant value (step S22: YES), the exposure control unit 52 selects the second exposure mode (step S23). On the other hand, in a case where the exposure control unit 52 determines that the amount of shake is less than the constant value (step S22: NO), the exposure control unit 52 selects the first exposure mode (step S24). The imaging sensor 20 is exposed in the exposure mode selected by the exposure control unit 52.

After step S23 or step S24, the exposure control unit 52 determines whether or not the motion picture imaging is completed (step S25). In a case where the exposure control unit 52 determines that the motion picture imaging is not completed (step S25: NO), the exposure control unit 52 returns the processing to step S21 and executes step S21 again. On the other hand, in a case where the exposure control unit 52 determines that the motion picture imaging is completed (step S25: YES), the exposure control unit 52 ends the processing.

As described above, in a case where the amount of shake delivered to the imaging apparatus 10 is large, the second exposure mode suitable for suppressing the shake is selected.

Third Embodiment

Next, a third embodiment will be described. In the first embodiment, in a case where m≥2, the frames ranging from the 1st first frame F1(1) to the (m−1)th first frame F1(*m*−1) are not used in generating the motion picture data, and are discarded. On the other hand, in the third embodiment, in a case where m≥2, at least one of the 1st first frame F1(1) to the (m−1)th first frame F1(*m*−1) is acquired, and the acquired first frame is used for shake correction and/or focus adjustment. It should be noted that the shake correction and the focus adjustment are just examples, and the acquired first frame may be used for other functions such as scene recognition and subject recognition for imaging. The present embodiment is the same as the above-mentioned embodiment in that the frames ranging from the 1st first frame F1(1) to the (m−1)th first frame F1(*m*−1) are not used in generating the motion picture data.

Figure 17:
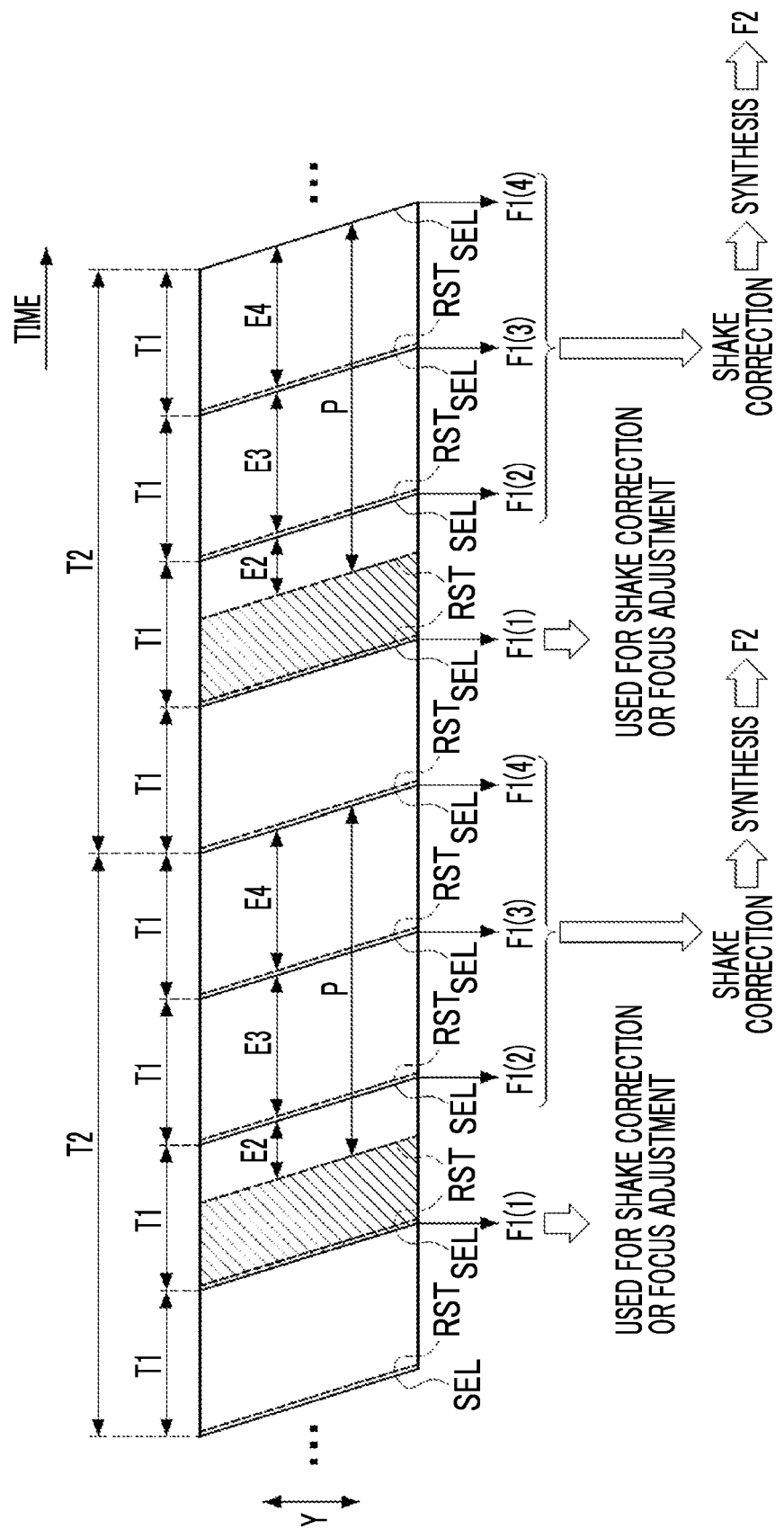
FIG. 17 is a diagram showing an example of an imaging operation according to a third embodiment.

FIG. 17 shows an example of the imaging operation in a case where m=2. In a case where m=2, the 1st first frame F1(1) is used for shake correction or focus adjustment. In a case where the 1st first frame F1(1) is used for shake correction, the shake correction unit 46 performs shake correction on the basis of the movement vector obtained by a difference between the frames.

Further, in a case where the first frame F1(1) is used for the shake correction, the main control unit 50 controls the lens driving control unit 34, on the basis of the signal of the phase difference pixel included in the first frame F1(1). Therefore, the focus adjustment of the phase difference method is performed.

The same applies to a case where m≥3. For example, in a case where m=3, shake correction and/or focus adjustment is performed using the 1st first frame F1(1) and the 2nd first frame F1(2).

As described above, in the present embodiment, the first frame that is not used in generating the motion picture data is effectively utilized.

Fourth Embodiment

Next, a fourth embodiment will be described. In the first embodiment, the translational shake and the rotational shake are corrected for the first frame before being synthesized by the frame synthesis unit 47. On the other hand, in the fourth embodiment, the translational shake is corrected for the first frame, and the rotational shake is corrected for the second frame synthesized by the frame synthesis unit 47.

Figure 18:
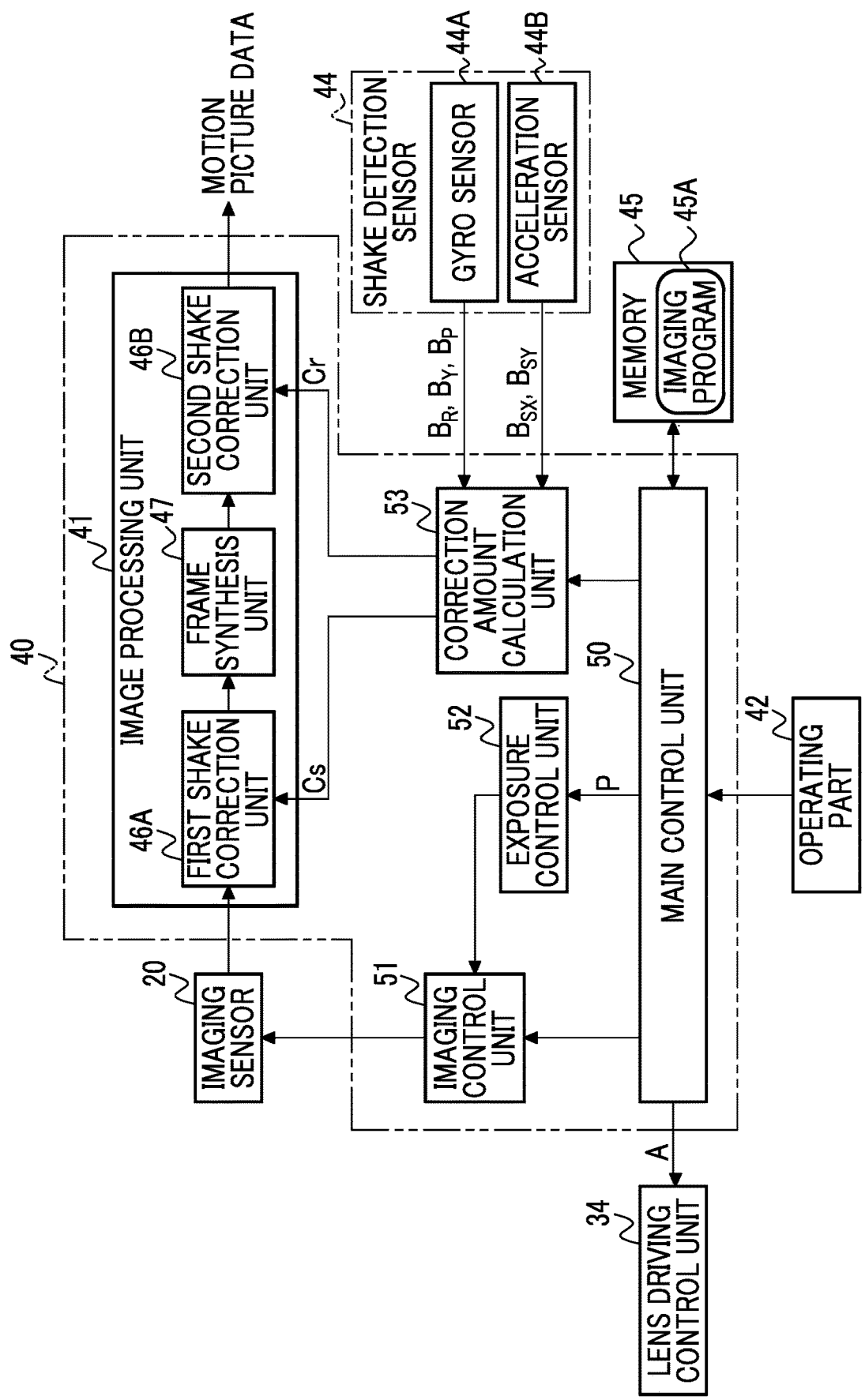
FIG. 18 is a diagram showing an example of a configuration of an image processing unit according to a fourth embodiment.

FIG. 18 shows a configuration of the image processing unit 41 according to the fourth embodiment. As shown in FIG. 18, in the present embodiment, the image processing unit 41 has a first shake correction unit 46A, a second shake correction unit 46B, and the frame synthesis unit 47. The first shake correction unit 46A is disposed in front of the frame synthesis unit 47. The second shake correction unit 46B is disposed after the frame synthesis unit 47. The shift amount Cs is input to the first shake correction unit 46A from the shift amount calculation unit 69. The rotation amount Cr is input to the second shake correction unit 46B from the rotation amount calculation unit 68.

Figure 19:
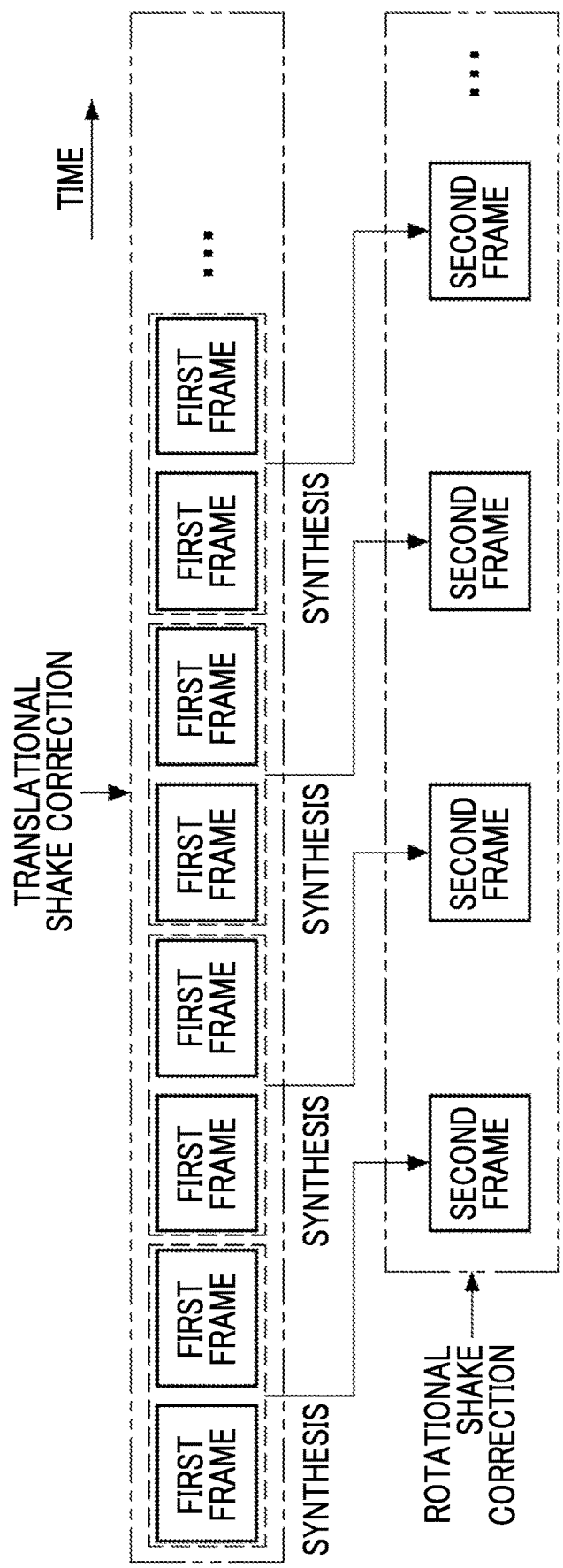
FIG. 19 is a diagram showing shake correction according to a fourth embodiment.

FIG. 19 shows the shake correction according to the fourth embodiment. As shown in FIG. 19, the first shake correction unit 46A performs translational shake correction for the first frame, on the basis of the shift amount Cs which is input from the shift amount calculation unit 69. The frame synthesis unit 47 generates the second frame by synthesizing the plurality of first frames on which translational shake correction is performed. The second shake correction unit 46B performs the rotational shake correction for the second frame, on the basis of the rotation amount Cr which is input from the rotation amount calculation unit 68.

In the translational shake correction and the rotational shake correction, arithmetic processing such as projective transformation or affine transformation is necessary. In particular, since the rotational shake correction requires a longer time for the arithmetic processing as compared with the translational shake correction, there is a possibility that the processing is not completed during the first frame period. As in the present embodiment, by performing the rotational shake correction for the second frame having a long frame period, it is possible to reliably perform the rotational shake correction.

It should be noted that the first shake correction unit 46A and the second shake correction unit 46B may each be configured to correct a shake component in a specific frequency band. Further, the frequency band of the translational shake corrected by the first shake correction unit 46A and the frequency band of the rotational shake corrected by the second shake correction unit 46B may be different from each other. Furthermore, the translational shake detection frequency band detected by the shake detection sensor 44 and the rotational shake detection frequency band detected by the shake detection sensor 44 may be different from each other.

Fifth Embodiment

Next, a fifth embodiment will be described. In the fourth embodiment, the image processing unit 41 has one frame synthesis unit. On the other hand, in the fifth embodiment, the image processing unit 41 has a plurality of frame synthesis units.

Figure 20:
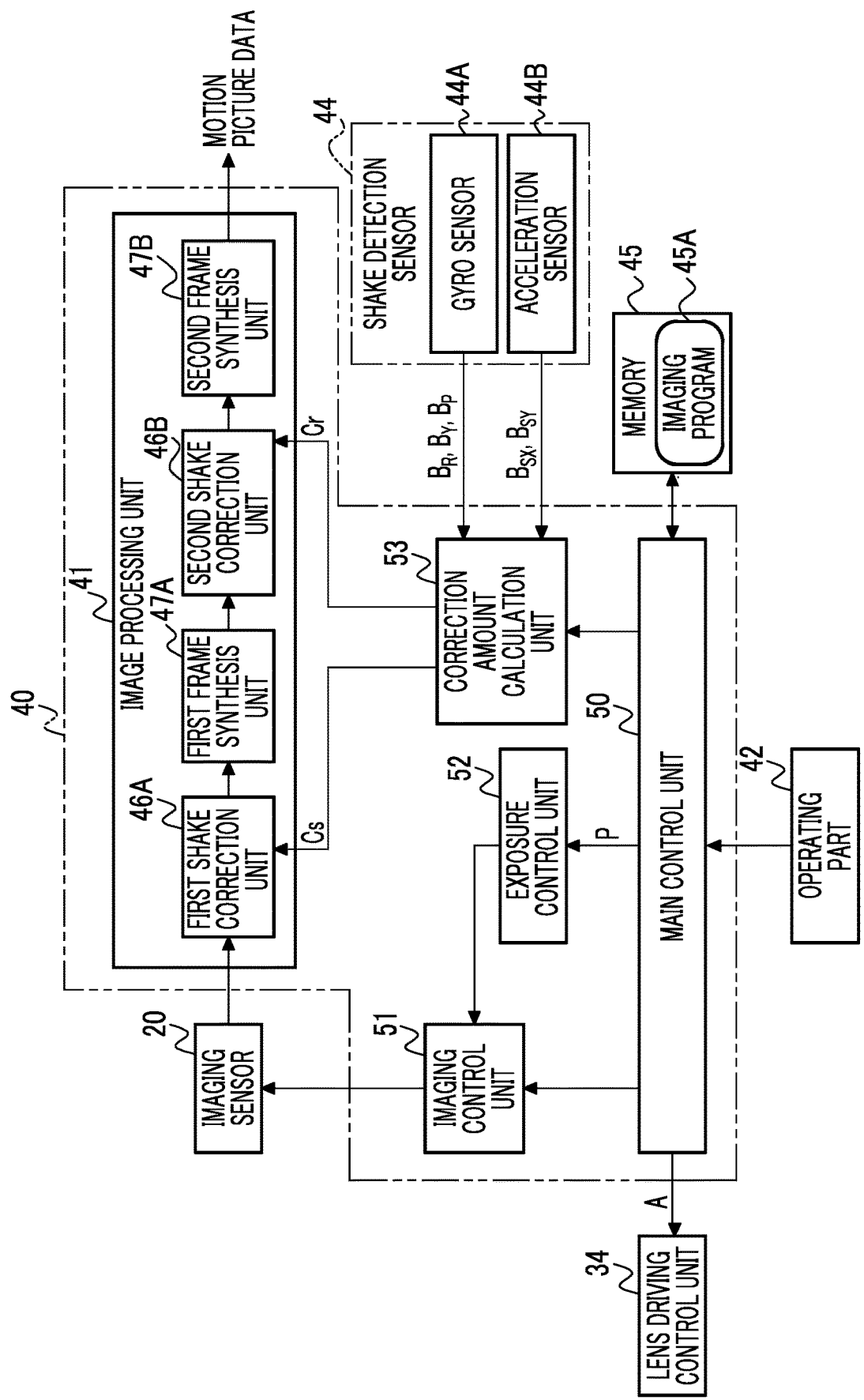
FIG. 20 is a diagram showing an example of a configuration of an image processing unit according to a fifth embodiment.

FIG. 20 shows a configuration of the image processing unit 41 according to the fifth embodiment. As shown in FIG. 20, in the present embodiment, the image processing unit 41 has the first shake correction unit 46A, the second shake correction unit 46B, a first frame synthesis unit 47A, and a second frame synthesis unit 47B. The first shake correction unit 46A is disposed in front of the first frame synthesis unit 47A. The second shake correction unit 46B is disposed after the first frame synthesis unit 47A. The second frame synthesis unit 47B is disposed after the second shake correction unit 46B. The shift amount Cs is input to the first shake correction unit 46A from the shift amount calculation unit 69. The rotation amount Cr is input to the second shake correction unit 46B from the rotation amount calculation unit 68.

In a case where M<N (where M is a positive integer and N is a multiple of M), the first frame synthesis unit 47A generates a synthetic frame by synthesizing M first frames. In a manner similar to the first embodiment, N is a value which is obtained by dividing the first frame rate by the second frame rate. The second frame synthesis unit 47B generates the second frame by synthesizing N/M synthetic frames. For example, in a case where N=4 and M=2, the first frame synthesis unit 47A generates a synthetic frame by synthesizing two first frames, and the second frame synthesis unit 47B generates the second frame by synthesizing two synthetic frames.

FIG. 21 shows the shake correction according to the fifth embodiment. As shown in FIG. 21, the first shake correction unit 46A performs translational shake correction for the first frame, on the basis of the shift amount Cs which is input from the shift amount calculation unit 69. The first frame synthesis unit 47A generates a synthetic frame by synthesizing a plurality of first frames on which the translational shake correction is performed. The second shake correction unit 46B performs the rotational shake correction for the synthetic frame, on the basis of the rotation amount Cr which is input from the rotation amount calculation unit 68. The second frame synthesis unit 47B generates the second frame by synthesizing the plurality of synthetic frames on which the rotational shake correction is performed.

It should be noted that the first shake correction unit 46A may perform shake correction on the first frame, on the basis of the first amount of shake, at which the shake correction is completed in the first frame period (that is, 1/(V×N) seconds), among the amounts of shake delivered to the imaging apparatus 10. Further, the second shake correction unit 46B may perform shake correction on the synthetic frame on the basis of the second amount of shake, at which the shake correction is completed at N/M times the first frame period (that is, 1/(V×M) seconds), among the amounts of shake delivered to the imaging apparatus 10. In the present embodiment, the first amount of shake is an amount of translational shake, and the second amount of shake is an amount of rotational shake.

The present embodiment is suitable, for example, in a case where the first frame rate is 240 fps and the second frame rate is 30 fps. In such a case, V=30 and N=8, and for example, M=2.

MODIFICATION EXAMPLE

In each of the above-mentioned embodiments, the amount of shake delivered to the imaging apparatus 10 is detected by the acceleration sensor 44B. However, the amount of shake may be detected on the basis of a movement vector which is obtained by a difference between frames. Further, the amount of shake may be detected by obtaining the number of spatial frequencies or the like for one frame by image analysis.

Further, in each of the above-mentioned embodiments, the image processing unit 41 is a part of the processor 40, but the image processing unit 41 may be provided separately from the processor 40. The processor 40 and the image processing unit 41 are examples of the processor according to the technique of the present disclosure.

Further, each of the above-mentioned embodiments can be combined with each other as long as no contradiction occurs.

In the above-mentioned embodiments, various processors shown below can be used as the hardware structure of the control unit using the processor 40 as an example. The various processors include, in addition to the CPU, which is a general-purpose processor that functions by executing software (program), a processor such as an FPGA of which the circuit configuration can be changed after manufacturing. The FPGA includes a dedicated electric circuit, which is a processor having a circuit configuration specially designed for executing a specific processing, such as PLD or ASIC.

The control unit may be configured as one of the various processors, or may be configured as a combination of two or more of the same or different kinds of processors (for example, a combination of a plurality of FPGAs or a combination of a CPU and an FPGA). Further, the plurality of control units may be constituted of one processor.

A plurality of examples in which a plurality of control units are configured as one processor can be considered. In the first example, as represented by computers such as a client and a server, there is a form in which one processor is constituted of a combination of one or more CPUs and software and this processor functions as a plurality of control units. As a second example, as typified by system on chip (SOC), there is a form in which a processor that implements the functions of the whole system which includes a plurality of control units with one IC chip is used. As described above, the control unit can be configured by using one or more of the above-mentioned various processors as a hardware-like structure.

Further, as the hardware structure of these various processors, more specifically, it is possible to use an electric circuit in which circuit elements such as semiconductor elements are combined.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. Further, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging apparatus comprising:
an imaging sensor; and
at least one processor, the processor is configured:
imaging processing of acquiring a plurality of first frames, which are imaged at a first frame rate in a first exposure mode, through the imaging sensor;
correction processing of performing electronic shake correction on the plurality of first frames on the basis of an amount of shake delivered to the imaging apparatus; and
generation processing of generating motion picture data, which has a second frame having a second frame rate lower than the first frame rate, by synthesizing the plurality of first frames, and
in the first exposure mode, the processor sets m as a positive integer, and makes an exposure time for an mth first frame constituting the second frame shorter than an exposure time for an (m+1)th first frame.

2. The imaging apparatus according to claim 1, wherein assuming that a unit time corresponding to a shutter speed is P, the second frame rate is V, a value obtained by dividing the first frame rate by the second frame rate is N, and n is a positive integer, and m is a maximum n satisfying $P<1/V-(n-1)/(V \times N)$, in the first exposure mode, the processor generates the second frame by synthesizing mth to Nth first frames among 1st to Nth first frames, and makes the exposure time for the mth first frame shorter than the exposure time for the (m+1)th first frame.

3. The imaging apparatus according to claim 2, wherein a sum of respective exposure times for the mth to Nth first frames is equal to the unit time.

4. The imaging apparatus according to claim 3, wherein the exposure time for the mth first frame is shorter than a frame period of the first frame, and respective exposure times for (m+1)th to Nth first frames are equal to the frame period of the first frame.

5. The imaging apparatus according to claim 4, wherein the respective exposure times for the mth to Nth first frames are temporally continuous.

6. The imaging apparatus according to claim 2, wherein in a case where m≥2, the processor acquires at least one of 1st to (m−1)th first frames that are not used in generating the motion picture data.

7. The imaging apparatus according to claim 6, wherein the processor uses the acquired plurality of first frames in the shake correction.

8. The imaging apparatus according to claim 6, wherein:
the imaging sensor has a phase difference pixel, and
the processor performs focus adjustment on the basis of a signal of the phase difference pixel included in the acquired first frame.

9. The imaging apparatus according to claim 2, wherein the processor makes a second exposure mode, in which exposure is performed, executable by distributing an exposure time to each of the mth to Nth first frames.

10. The imaging apparatus according to claim 9, wherein the processor makes the first exposure mode and the second exposure mode selectively executable.

11. The imaging apparatus according to claim 10, wherein the processor detects a speed of movement of a subject, selects the first exposure mode in a case where the speed of movement is equal to or greater than a constant value, and selects the second exposure mode in a case where the speed of movement is less than the constant value.

12. The imaging apparatus according to claim 10, wherein the processor selects the first exposure mode in a case where the amount of shake is less than a constant value, and selects the second exposure mode in a case where the amount of shake is equal to or more than the constant value.

13. The imaging apparatus according to claim 2, wherein in a case where M is a positive integer, N is a multiple of M, and M<N,
the processor,
performs shake correction on the plurality of first frames on the basis of a first amount of shake in which the shake correction is completed in $1/(V \times N)$ seconds, in the amount of shake,
performs shake correction on a synthetic frame obtained by synthesizing M first frames on the basis of a second amount of shake in which the shake correction is completed in $1/(V \times N)$ seconds, in the amount of shake, and
generates the second frame by synthesizing N/M synthetic frames.

14. The imaging apparatus according to claim 1, further comprising a shake detection sensor that detects rotational shake in a roll direction and translational shake in an intersection direction intersecting a rotation axis in the roll direction,
wherein the processor performs translational shake correction on the plurality of first frames, and performs rotational shake correction on the second frame.

15. The imaging apparatus according to claim 1, wherein the processor,
performs shake correction of rotational shake in a roll direction on the second frame, in the amount of shake, and
performs shake correction of translational shake in an intersection direction intersecting a rotation axis in the roll direction on the plurality of first frames, in the amount of shake.

16. A driving method of an imaging apparatus including an imaging sensor, the driving method comprising:
an imaging step of acquiring a plurality of first frames, which are imaged at a first frame rate in a first exposure mode, through the imaging sensor;
a correction step of performing electronic shake correction on the plurality of first frames on the basis of an amount of shake delivered to the imaging apparatus; and
a generation step of generating motion picture data, which has a second frame having a second frame rate lower than the first frame rate, by synthesizing the plurality of first frames, and
wherein in the first exposure mode, m is a positive integer, and an exposure time for an mth first frame constituting the second frame is made shorter than an exposure time for an (m+1)th first frame.

17. A non-transitory computer readable medium storing an imaging program that operates an imaging apparatus including an imaging sensor, the imaging program being configured to execute:
imaging processing of acquiring a plurality of first frames, which are imaged at a first frame rate in a first exposure mode, through the imaging sensor;

correction processing of performing electronic shake correction on the plurality of first frames on the basis of an amount of shake delivered to the imaging apparatus; and generation processing of generating motion picture data, which has a second frame having a second frame rate lower than the first frame rate, by synthesizing the plurality of first frames, wherein in the first exposure mode, m is a positive integer, and an exposure time for an mth first frame constituting the second frame is made shorter than an exposure time for an (m+1)th first frame.

* * * * *